INVENTORS.
JOHN T LYNCH
FRED G WOLFF

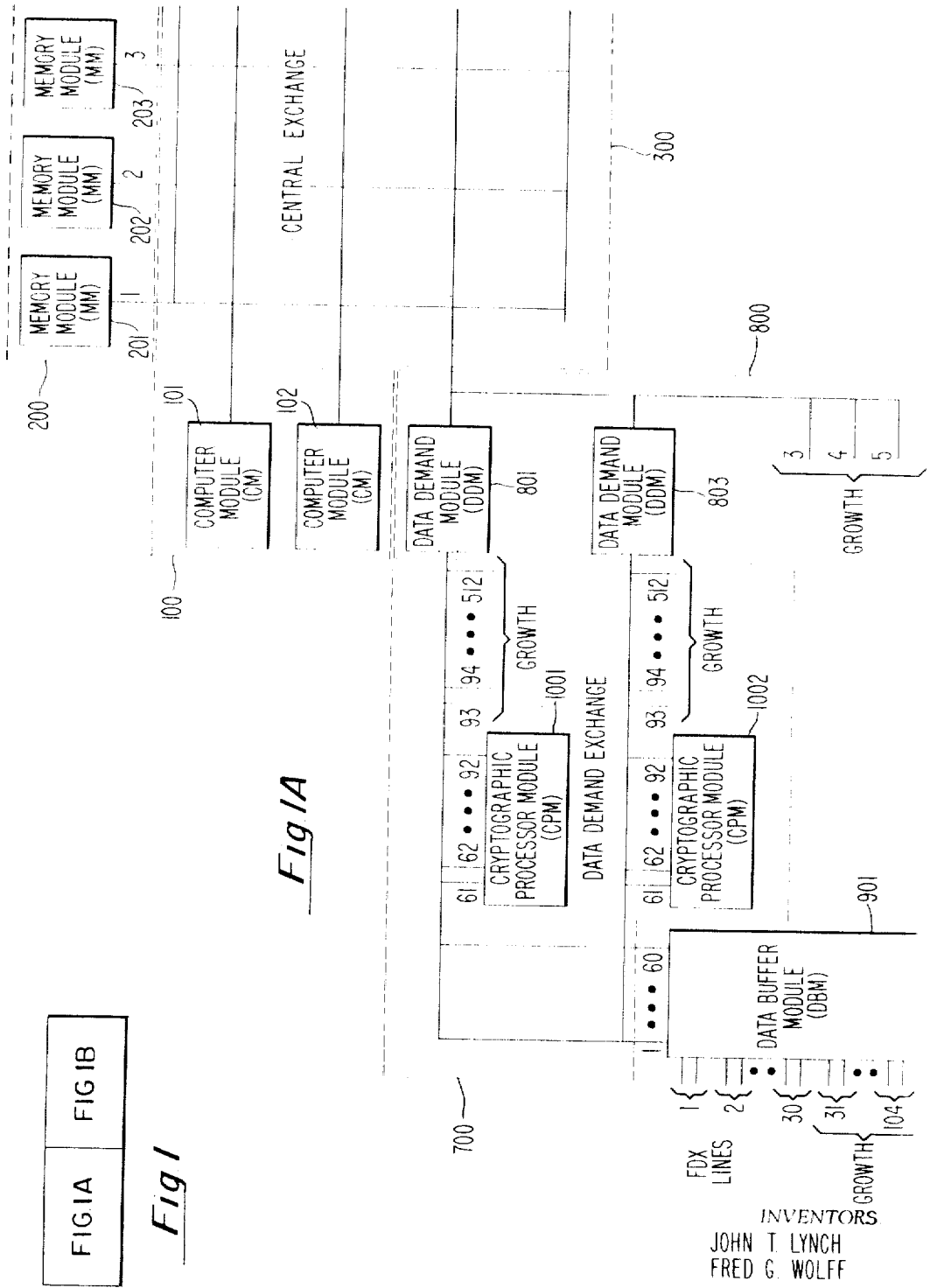

INVENTORS.
JOHN T. LYNCH
FRED G. WOLFF

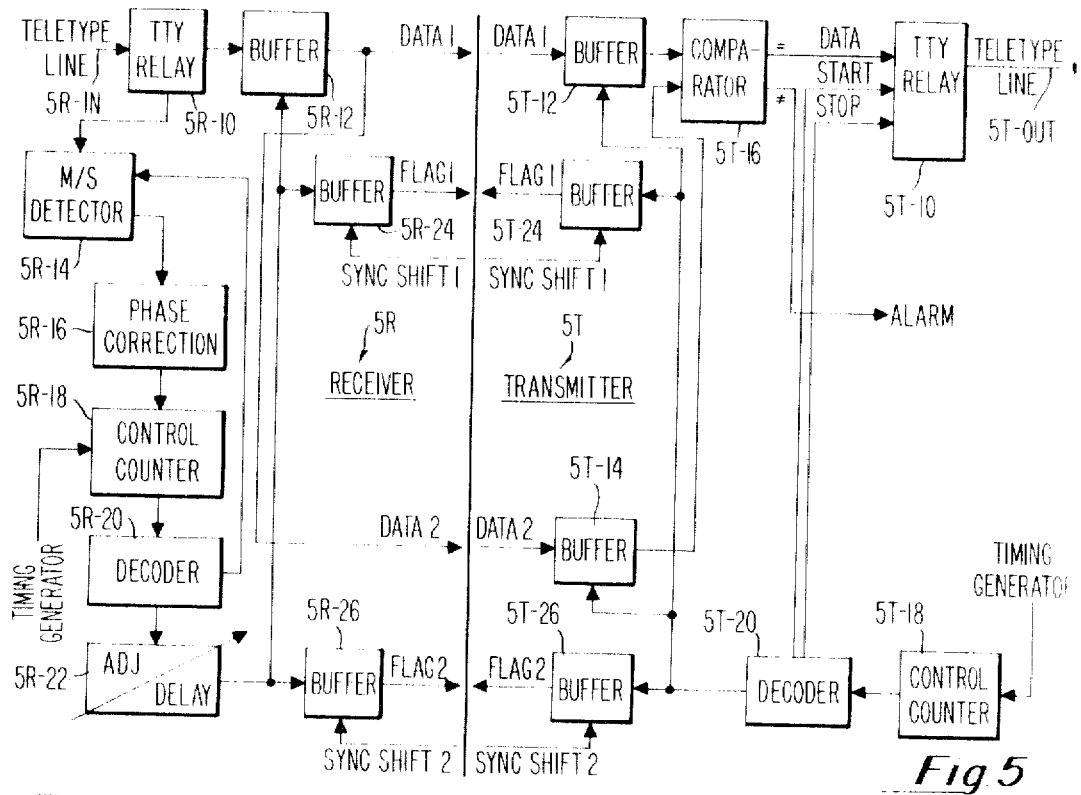
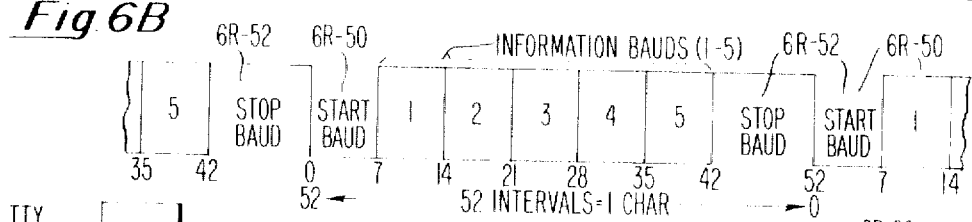
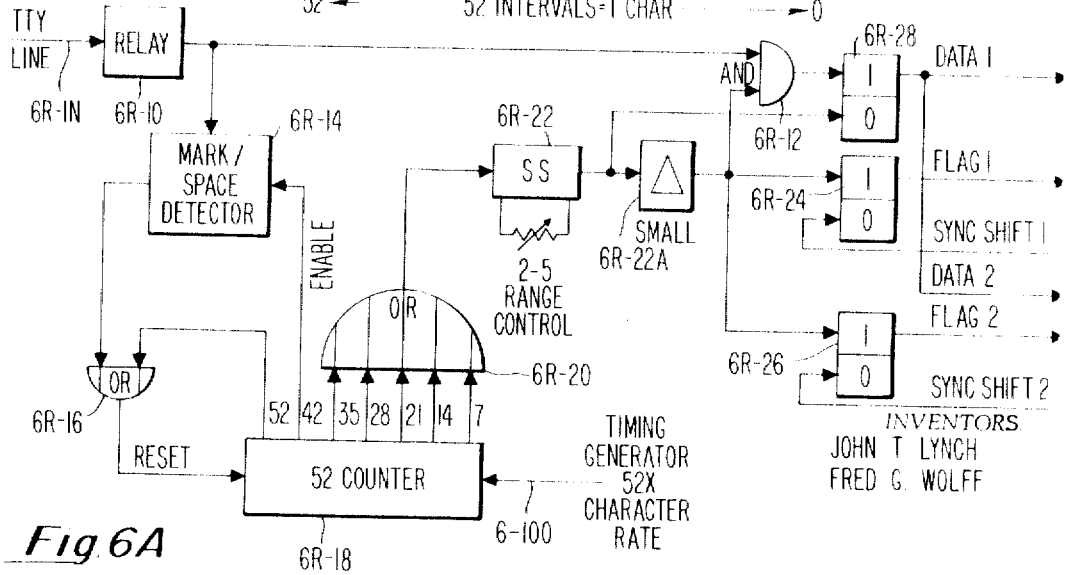

United States Patent Office 3,302,182
Patented Jan. 31, 1967

3,302,182
STORE AND FORWARD MESSAGE SWITCHING SYSTEM UTILIZING A MODULAR DATA PROCESSOR
John T. Lynch, Lionville, and Fred G. Wolff, Paoli, Pa., assignors to Burroughs Corporation, Detroit, Mich., a corporation of Michigan
Filed Oct. 3, 1963, Ser. No. 313,591
19 Claims. (Cl. 340—172.5)

The present invention relates to message switching systems and more particularly relates to a message switching system of the store and forward type in which a totally modular data processor is utilized to achieve a highly automated switching exchange.

When the volume of digital communications increases in existing networks, and when new networks are contemplated, it is usually found that more efficient utilization of communication channels and further, higher effective transmission speeds can be obtained with store and forward message switching systems than with circuit switching techniques. Whereas circuit switching techniques or networks operate much like a telephone exchange, in which a clear path from originator to recipient must be established before communication can commence, store and forward message switching systems are somewhat analogous to a postal system. That is, a message is delivered to the nearest post office where it is sorted and transmitted to the proper destination as the facilities become available. This may be done by one or more post offices. However, the originator, in the meantime, is free to enter into other communication.

In a store and forward message switching system high precedence messages—somewhat like special delivery mail—receive special handling, resulting in virtually direct connection between subscribers for exchange of voluminous traffic.

Additional advantages of store and forward message systems include the facility to translate between different codes. Thus, a teletype message may enter coded in International Alphabet #2 or, as it is usually called, Baudot code, and leave in Fieldata code. In Baudot each computer word is broken into 8 characters of 5 bauds and one blank each. In Fieldata each word is represented by 6 characters of 8 bits each to each 48-bit memory word. Another advantage is the ability to address a message to a number of destinations by the use of multiple or group routing indicators and a complete message accounting system with statistical and message retrieval capabilities.

Store and forward message systems have been in use for some time in teletype networks. Their simplest form is perhaps the "torn-tape" switching center. This type of switching center is so named because incoming messages are punched into paper tape, manually removed from the receiving equipment and hand-carried to the proper transmission devices. At this point the punched paper tape is converted back into electrical signals for further transmission to the addressee. A more sophisticated application of a message switching is the use of cross-office switching techniques.

Within the last few years, attempts have been made to utilize digital data processors in message switching systems. While such machines are well suited to the task, one of the most serious objections to their use in such applications has been the vulnerability of an entire switching center to a single failure in any part of the system. In most systems, such as the more complicated military communication networks, this has resulted in the use of two separate parallel data processors. This, of course, meant one standing by in case the machine in use would experience a failure. Further, a complicated system of automatic switchover equipment was necessary to achieve the switchover in the event of the first system failure. Finally, there was the inherent problem that the automatic switching equipment itself would fail, in which event the availability of the second system would be in vain.

The present invention utilizes a data processing system in a switching system which has solved the problem of standby second systems and automatic switchover networks. It has done this by using a totally modular data processing system to implement a novel message switching system to achieve entirely new results. The preferred totally modular data processing system shown in the present embodiment is the subject of four co-pending patent applications which are assigned to the present assignee. They are entitled: A Modular Computer System, U.S. patent application S.N. 246,855, filed Nov. 30, 1962; Computer, U.S. patent application S.N. 241,273, filed Nov. 30, 1962; A Data Processor Input/Output Control System, U.S. patent application S.N. 241,421, filed Nov. 30, 1962; and Automatic Interrupt System for a Data Processor, U.S. patent application S.N. 241,225, filed Nov. 30, 1962. The subject matter of those applications is incorporated herein by reference for a complete and more detailed description of an entire data processing system with which this invention may be practiced.

While the computer system related to above has been described in detail in the referenced co-pending application, it will be referred to herein briefly to better orient the unique portion and its operation, which will be disclosed herein in detail.

The preferred modular data processing system is composed entirely of independent, interconnected modules which function as memories, computers, or input-output control modules. The system capacity is easily expanded by inserting additional identical modules. Thus, growth is quickly and inexpensively achieved compared to the usual related cost of re-programming or replacing existing equipment. The complete system allows for the attainment of a truly parallel processing operation because each Computer Module has access to each and every memory module. The Computer Module processes data and performs arithmetic operation in a series-parallel manner at multimegacycle speeds. Each Computer Module has its own clock and operates synchronously with other Computer Modules. A number of thin-film storage registers and an operand bank memory are included in each Computer Module and operate at the system clock speed. This, of course, greatly reduces the number of required accesses to the core Memory Modules. The core Memory Modules of this data processing system combine to provide a totally shared system memory which has been designed for flexible adaptation to many memory techniques.

The Input-Output Control Module provides control signals, parity checks, time interface and data transformations for input-output peripheral devices. Briefly, the Input-Output Control Module consists of an instruction register and associated decoding circuitry, a data register, and the manipulation register with associated timing and control circuits. Each control module is capable of controlling any standard peripheral device of the input-output complement. There can be as many simultaneous input-output operations as there are Input-Output Control Modules. A matrically arranged input-output exchange is utilized as the network through which the Input-Output Control Module is automatically connected with any of the input or output peripheral devices. The automatic interconnection between the control module and the selected peripheral device is under the command of one of the Computer Modules. The Input-Output Control Modules also provide a constant input and output interface for universal ease of expansion.

The above-described totally modular data processing system is ideally matched to store and forward message switching system requirements. It is seen by reference to FIGURE 1 that the truly modular system permits a well balanced system regardless of the size of the switching center. It also allows considerable system growth without basic hardware or program changes by the simple addition of functional modules or program routines. The application of the modular concept to the store and forward message switching system also makes it unnecessary to have a complete standby system. Instead, it is only necessary to have one additional module of each type than is functionally required.

For example, if a system requires five Memory Modules, it is only necessary to supply a sixth module. As long as any five of the six Memory Modules are available, the system is entirely operational. However, even if only four modules should become available, the system will remain at least partially operation. This continued partial operation as individual modules become inoperative is often referred to as graceful degradation. It is a desirable system feature inherent in the present data processor. The additional module approach holds true for all of the functional modules of the entire message switching system, thereby eliminating the necessity for a complete standby system. Naturally, there is a corresponding disappearance of the complex switching change-over equipment previously described as necessary on prior systems which utilized standby data precessors. The crossbar type exchanges, shown in FIGURE 1, interconnecting the various modules of the message switching system, do not exist as separate pieces of hardware, but are functionally distributed among the modules they serve; that is, the removal of a module does not affect any other module connected to the same exchange.

In many message switching systems there is a need for the handling of crypted messages. Systems exist which handle, to the exclusion of clear text, only crypted messages. However, it is desirable to have a system whose channels will handle messages which are either crypted or clear. A problem, however, is the separation of messages which are in clear text from those which are crypted. Prior systems usually solve this by having separate lines whose interconnection means are matched only to a particular cryptographic device. Thus, each cryptographic channel had a separate receiver on its input line and a separate transmitter on its output line. Naturally, this requirement placed a heavy burden on the system hardware demands, and the number of cryptographic channels were necessarily restricted. However, in the present system, a novel approach enables the message switching center to receive, on any of its lines, both crypted and clear text interchangeably. This is accomplished by a unique arrangement through the use of a separate off-line Cryptographic Processing Module. All input and output channels are handled identically whether they are clear or cryptic channels. Any channel of the switching system will receive the information from any line and thereby immediately free the line for further use. The received information is separated by the system and placed into separate areas of the memory allocated for crypted and clear text. The information stored in the crypted portion of the memory is forwarded, in order of succession, to the cryptographic processor, where it is decoded and returned to the clear text portion of the memory. The decoding is performed by a single receiver through which the crypted messages entering the system are serially fed in a timed shared sequence. While the explanation, including the reference to "off-line" operation, would indicate a considerable loss of time occurs between the receipt of the message and its conversion, the delay can be measured in microseconds. Further, the advantages which are achieved by this configuration far offset any slight time delay. The saving achieved by the use of a central Cryptographic Processor is not limited to the initial cost reduction brought about by the elimination of the additional receivers and transmitters. Additional savings are realized in floor space, power requirements, air conditioning, maintenance, as well as logistics.

The increased dependability of the system becomes apparent when it is realized that the modular system can be configured to provide any degree of reliability. No single component failure can disable more than one functional module. As soon as the failure is realized by the executive program, the program will automatically reschedule the work load around the failed module until it has been notified that the module has been repaired. As has been previously mentioned, a typical system will have one backup module for each functional module of the system, to thereby avoid disabling the system by any single component.

In addition, whenever the system error-checking facilities reveal a malfunctioning or even suspicious module, the module is disconnected functionally from the operating system and is given further exercises and tests to isolate the particular trouble. When a module is isolated, the checkup is conducted under control of the module's own control panel. Violations of the cryptographic security are eliminated by built-in checks and alarms in the duplexed cryptographic processor and by tagging each computer word containing clear text with an identifying bit. Before data is transmitted on protected circuits, each word is checked for this bit. If the bit is present the word is not transmitted, and an alarm condition is indicated to the operator.

All messages are processed and stored via two independent paths. As a message flows through a system it is compared and checked at various points for correctness.

The message switching system included herein is extremely flexible. It may be initially implemented for teletype traffic of relatively low speed. However, it is capable of processing high-speed digital data in any standard format. Conversion to and from codes such as teletype Baudot code or Fieldata code is accomplished by programmed cable hook-up. Such conversions require no additional equipment and the addition of only minor program subroutines. The system is compatible with networks using various other codes, formats and procedures, and many other variations can be obtained by including appropriate subroutines in the processing program. No special hardware is needed other than to match any particular interface. Since the program is made up of many independent routines, routines may be added, deleted or bypassed, or their order of priority changed, by simple operator intervention. This feature is particularly advantageous in accommodating routine and emergency routing plans or changes with a minimum of operator effort.

Maximum use of the decision-making capabilities of the operator or supervisor is made by relieving him of all routine matters and bringing only exceptions to his attention. The operator has a complete display of system status, module status, as well as circuit status. He can monitor or intervene in any of the processing routines and extract or insert messages or modify message headings either with or without balancing of the ledger. Among the alarm conditions indicated to the operator are:

(1) Module and circuit outages,
(2) Circuit synchronization loss,
(3) Channel sequence number error, incoming or outgoing,
(4) Security violation of an incoming message,
(5) Security violation attempted by an outgoing message or an internal transfer of such message,
(6) High-precedence message in switching center,
(7) Overdue message in switching center,
(8) Improper header on incoming message,
(9) Suspected garbled message, incoming or in switching center,
(10) Crypto alarms, and
(11) Traffic for closed station.

The present switching center automatically groups messages according to a predetermined routing plan which may be easily altered by the operator to effect the most efficient utilization of the network. Multiple and group addresses are most efficiently handled and routine line segregation, pilot modifications, and other procedural requirements are automatically carried out under program control. Station or channel identification and number are checked on input to the system and are automatically generated on the output from the system.

Messages are transmitted in order of precedence and by time of arrival within each precedence classification. Flash and emergency messages will interrupt or "bust" any lower precedence message presently on the line with the proper cancellation and termination sequence. Interrupted messages are re-transmitted automatically in their proper turn.

In a system handling secured information, each message has its security classification checked against that of the intended channel and addressee prior to transmission. Potential security violations are brought to the attention of the operator and require positive operator intervention before transmission can be effected. Security violations on incoming lines cause an immediate and automatic transmission to restrict the further transmission of such violated information. The present procedure specified is CANTRAN; however, any equivalent procedure is possible.

The present invention, therefore, assures absolute maximum utilization of all channels terminating at the switching center by immediately diverting traffic from all incoming lines and by insuring that all outgoing lines are kept busy as long as traffic is available.

The modular concept has been followed in arranging the position of the centralized Cryptographic Processor in the switching system. These processors are arranged off-line to the real time message flow to enable the switching system to be efficiently interfaced with either crypted or clear messages. The arrangement of the Cryptographic Processor with the totally modular data processor has been accomplished in a unique system arrangement which, coupled with the management features of the executive program, permits complete flexibility as to the option of a centralized Cryptographic Processor. The Cryptographic Processors are implemented with high-speed building blocks of the type used in the modular data processing system and, though they are arranged off-line to the real time message flow, the delay in real time is inconsequential.

It is, therefore, the primary object of this invention to provide a secure message switching center implemented with a totally modular data processor.

It is also an object of the present invention to provide a secure message switching center which is assembled from standardized modules such as computer, memory, and input-output modules, each having a thoroughly self-contained operation and capable of communication with other modules within the system, but independent of others having a similar function.

It is a further object of the present invention to provide a secure message switching center having a truly modular system organization to thereby obtain the highest possible reliability, flexibility, capacity, and growth potential.

It is a still further object of the present invention to provide a secure message switching center being implemented with a totally modular data processor, which processor is controlled by an executive control program which automatically allocates memory space and assigns programs based upon priority and precedence.

It is a still further object of the present invention to provide a message switching center operated in conjunction with a totally modular data processor controlled by an automatic operating and scheduling program having an assignment doctrine which considers the number of modules available to perform their function and makes programming independent of the specific configuration of the processing system and which also controls an extensive automatic interrupt system to provide a real time mode of control and to facilitate recognition and diagnosis of unavailable system elements.

It is also an object of the present invention to provide a message switching center which is capable of handling secure messages through a centralized Cryptographic Processor Module which can be included with, or added to, the operating system, to perform the function of all the Cryptographic receivers and transmitters ordinarily required by each individual channel of a secure message switching center.

Other objects and advantages will become apparent when the following description is read in conjunction with the accompanying drawings in which:

FIGURES 1A and 1B included in FIGURE 1 provide an overall block diagram of the proposed message switching center including the full Cryptographic capability previously described.

FIGURES 2A, 2B, 2C, and 2D illustrate the routing of message traffic in various stages of a routine message through the FIGURE 1 system.

FIGURE 5 is a block diagram of the receiver/transmitter control submodule to start or stop the teletype.

FIGURES 6A and 6B are a logic diagram of the receiver portion of a standard start-stop teletype control submodule shown in block form in FIGURE 5.

In order to describe the present switching center system, a typical 100-line message switching center will be considered. The equipment will include full Cryptographic capability as well as the future growth potential of the system. It is understood that if the Cryptographic function is not required the equipment complement may be reduced by one Memory Module and the two Cryptographic Processor Modules shown.

Figure 1B:
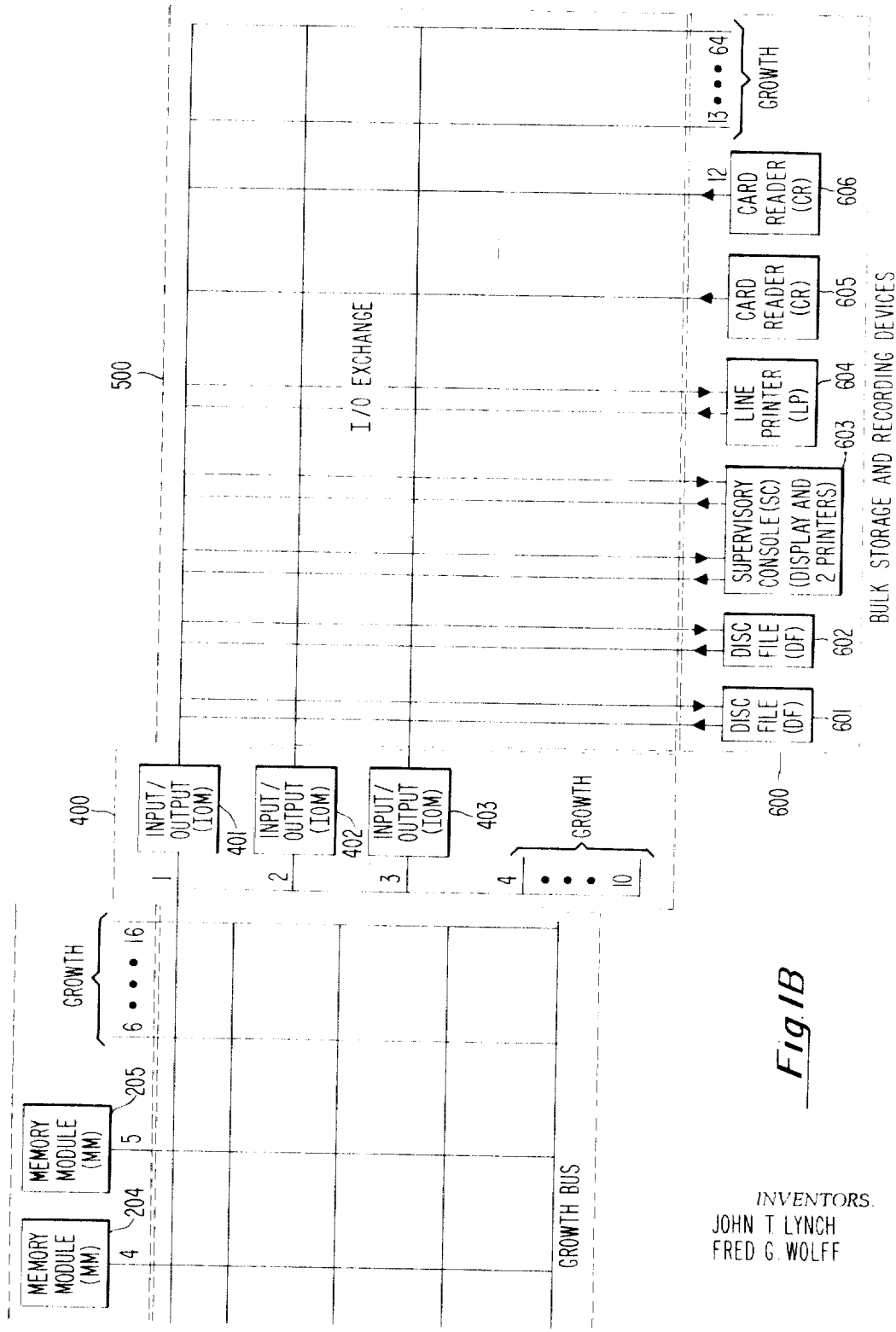

Referring to FIGURE 1 in particular, there is shown the equipment necessary to implement such a center.

The system organization is characterized by its fully shared core memory and concurrent operation of all functional modules. Computer Modules 100, Data Demand Modules 800, and Input-Output Modules 400 can simultaneously gain access to separate high-speed core Memory Modules 200. A memory addressing conflict is automatically resolved; the lower priority item is delayed the several microseconds it takes to complete the memory transfer of higher priority.

Because of its modular concept, the system enables a configuration to be chosen for a given application that is both effective and efficient, while also facilitating later changes. The data processing requirements for the assumed system of 100 lines indicate the necessity for one Computer Module and five Memory Modules. The requirement for no system outages, however, rules that one additional module of each type be incorporated into the system for effective back-up. Here is seen the value of the basic principle of modularity in the system organization: reliability is obtained through functional redundancy without full duplexing, by the inclusion of one additional module of each type required. This principle is applied throughout the system.

The switching center will be housed in a number of standard cabinets. The central processing elements, the Computer Modules 100, the Memory Modules 200, and the interface modules (the Input-Output Modules 400 and the Data Demand Modules 800), are interconnected by a central switching exchange 300. Computer Modules 100 service storage and record peripheral devices 600 through the input-output or record and store exchange 500 which is controlled by Input-Output Control Modules 400. Real time demand devices, such as communication channels, gain access to the central processor through a data demand or message switching exchange 700, which is serviced by the Data Demand Modules 800.

The interconnection switching exchanges 300, 500 and 700 permit the various functional modules of the system to intercommunication simultaneously without restriction. These exchanges are distributed among the units they service and do not exist physically except as part of a functional module. The switching exchanges, together with the selected equipment complement, form a system which, through functional equipment redundancy and alternate data transfer paths, cannot be disabled by any single component failure.

The growth indicated in FIGURE 1 is an inherent part of the basic system, since the control networks in the various functional modules are structured to accept the growth as shown.

The Data Buffer Module 900 will accommodate the addition of new lines (up to a total of 104 FDX channels) by the addition of small pluggable units into its wired backplane.

The Data Demand Modules 800 each has the capacity to service 512 data channels. They may be utilized by different Cryptographic Processors 1001 and 1002 or data links in any combination. The data links may be teletype or high speed, since the Data Demand Module 801 performs as asynchronous search of its 512 terminal data channels and services these channels on demand. The Data Demand Module 801 is configured to collect and process data at a rate of up to three million bits per second.

Each Input-Output Module can service a total of 64 channels, terminated in record and store peripheral devices 600 such as Disc Files, Card Readers and Line Printers; 52 lines are avaible for growth. Seven additional Input-Output Modules 400 may be added to service this exchange.

The central switching exchange 300 of the data processor is designed to accept an additional bus (growth) to share the common core memory store, and an additional nine Memory Modules may be added to total 16 high-speed core Memory Modules.

The number of modules necessary for this typical (100 FDX lines) installation shown in FIGURE 1 is as follows:

| Module type (FIG. 1 ref.): | No. of modules |
| --- | --- |
| Core Memory (200) | 6 |
| Computer (100) | 2 |
| Input-Output (400) | 3 |
| Data Demand (800) | 2 |
| Data Buffer (901) | 1 |
| Cryptographic Processors (1001, 1002) | 2 |
| Disc File (600) | 2 |
| Line Printer (600) | 1 |
| Card Reader (600) | 2 |
| Supervisory Console (600) | 1 |
| (Includes 2 supervisory printers) | |

Each of the 100 message tributary lines entering the Switching Center installation is terminated in a separate independent submodule of the Data Buffer Module 901. This Data Buffer Module performs the phase correction and synchronization functions necessary when many asynchronous communication links are being serviced. It also provides the buffer iterface between the signal levels of the communication links and the logic levels of the data processing equipment. Each of the independent, pluggable receiver/transmitter submodules, FIGURE 5, contains the circuits necessary to perform the function of presenting the proper interface to the communication line, depending upon the particular combination of speed and format used by the remote site. The submodule can simultaneously service incoming and outgoing messages; 104 such submodules may be housed in one standard cabinet, FIGURE 4.

Figure 4:
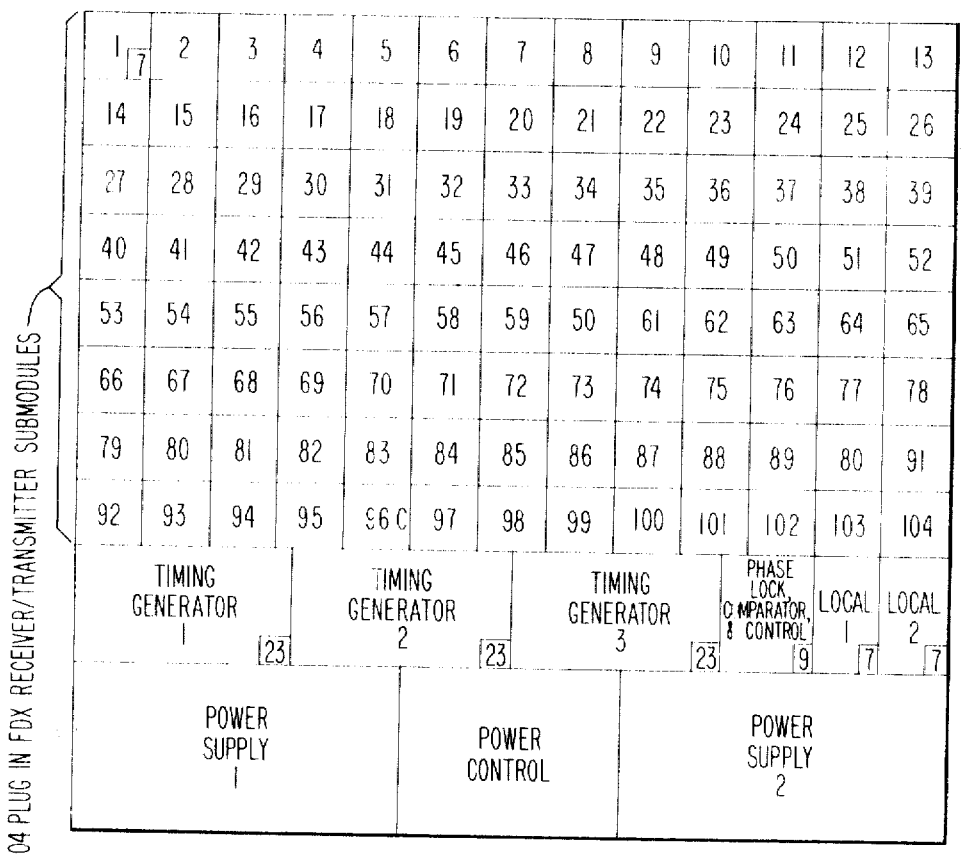
FIGURE 4 is a block layout of the Data Buffer Module showing the line-per-block submodules of the entire 100-line system.

Each data buffer submodule, 4–1 to 4–104, of FIGURE 4 collects the incoming information, and upon receipt of a valid information baud (bit), raises its flag to the Data Demand Modules 800, requesting service. The Data Demand Modules 800 honor these requests at a rate sufficient to guarantee that the submodule will have its request serviced before the incoming link is sampled for the next baud of information. The output of the submodule is interfaced and duplexed to te Data Demand Modules 801 and 802.

The data Demand Modules 800 perform the dual function of synchronizing the incoming message with the clock rate of the modular data processor and of packing the message bauds into 48–bit computer words (eight teletype characters, six Fieldata characters, etc.). When the Data Demand Modules 800 have accumulated a 48-bit computer word in their local memory, they transmit the word at a 3-megacycle rate into an assigned location in core memory 200. A block of core memory is reserved for each line. The size of the block of memory varies as a function of the number of lines being serviced. Each of the two Data Demand Modules 801, 802 constantly accumulates the same information; however, when a transfer to memory is made, each uses a different Memory Module 201, 202 for its message storage.

If the incoming message is being transmitted over an unprotected line, or if no Cryptographic Processor Module has been integrated into the system, one of the Computer Modules, 101 or 102, initiates the processing of the message. If the message is to be enciphered, it must first be routed through the Cryptographic Processor Module, 1001.

The Cryptographic Processor Module is constantly processing (enciphering or deciphering) information at a high speed; the switching center is so organized that the Cryptographic Processor Module 1001 sequentially examines the stored message block for each of the channels. After it has just completed processing a block of characters, the Cryptographic Processor Module 1001 indicates it is ready for the next block of characters by raising a flag to the Data Demand Module 801. The Data Demand Module then forwards another block of characters and the appropriate set-up data to the Cryptographic Processor Module where it is enciphered or deciphered as required. By utilizing the services of the Data Demand Modules 800, it is possible to simplify the controls of the Cryptographic Processor Modules 1001, 1002. As an incoming message is processed into clear text, it is restored into a different Memory Module location in core memory 200 where a block of memory is reserved for each channel. This process is carried on independently through each of the duplexed Cryptographic Processor Modules 1001, 1002. When the Cryptographic Processor Module completes servicing a channel, the set-up data for that channel is transmitted to core storage, and the Cryptographic Processor Module raises its flag to indicate it is ready to service the next channel. Analysis has indicated that the cryptographic set-up data for each channel for commonly used cryptographic equipments require only a modest amount of storage (e.g., 5 to 10 computer words).

When the clear-text message has filled two independent four-word buffer store locations in separate modules of memory 200, the computer program compares the contents of the two memory blocks, and if the comparison indicates no alarm condition, the four words are transferred to a 20-word buffer in Memory Module 203 of core memory.

The computer program examines the contents of the buffer based upon the immediate past history of the message link. If no message was in progress, the program determines if all the characters in the buffer are blanks; if so, the buffer is considered empty. If characters other than blanks appear in the buffer, the program determines whether a header (start-of-message) sequence is present. If a message was in progress, or if the start of a new message is indicated, the program initiates the processing of the message.

Since the switching center is responsible for all messages from time of reception until successful transmission to all required destinations, the computer prepares both a journal and a ledger of all traffic and stores them in module 204 of the memory 200. The journal records all incoming and outgoing traffic on a chronological basis. It does not contain whole messages, but only header information. The ledger is the balance sheet of the switching center to indicate the present message content status of the system.

The computer analyzes message headers to obtain the precedence, security classification, and the destination of the message. This information determines the place of the message in the queue table, which is also prepared by the computer. Channel co-ordination is performed by the Computer Modules 100, as are block parity computation and other error control procedures.

Transfer of data from Memory Modules 200 to the Bulk Storage devices 600 is accomplished on a multiple 20-computer-word message basis to amortize the relatively long access time required by Disc File memories 601 and 602. Access time for presently available Disc Files can be as long as 0.25 second. After the address is found, 270 microseconds are required per word transferred. In the worst case it takes 2.554 seconds to transfer 200 computer words in 20-word blocks, but only 0.3040 second to transfer a 200-word block containing multiple messages. Therefore, the data is retained in core memory module 203 until a 200-word block is accumulated. The entire block is then redundantly transferred to the Disc File bulk memory storage devices 601 and 602.

The assembly of a message from the 20-word blocks stored in bulk storage is accomplished by recording, in a table in core memory 200, the bulk addresses of the blocks comprising the message. In addition, each 20-word block is summed and the check-sum recorded along with the bulk address. When any block is retrieved from bulk storage, it is again summed and the check-sums compared.

The system maintains, in bulk storage peripheral devices 600, a complete station log. The size of the log will provide enough storage for at least 30 days by containing capacity for logging 250,000 messages. Entries are not erased until storage is required for a new entry. The log contains entries for all messages handled by the switching center, as well as chronological information on circuit conditions. Retrieval can be effected by the following indices or tags:

Incoming station or channel identification and number,
Switching center "in" number,
Number of addresses,
Outgoing channel identification and number,
Group count,
Precedence,
Error classification, if any,
Category of message text,
Circuit condition classification (for circuit information),
Time and date.

Automatic search can be made (under program control) for an individual message, a given class of messages, or for statistical summaries such as number of messages of a given precedence in a stated period. A convenient high-speed printout can be obtained on the Line Printer recording device 604.

In addition to the 30-day station log, which serves both statistical and historical purposes, a three-day message log is kept in bulk storage. This log is designed to hold the maximum message traffic for any three-day period; however, messages are not erased until space is needed for new entries.

Message retrieval is by one tag only: the incoming channel or station identification and number. Retrieval by other tags is accomplished by obtaining the pertinent channel or station identification and number from the 30-day station log, which can be searched by many tags.

Data transfer between core memory 200 and the Disc Files 601, 602 is maintained by and through the Input-Output Control Modules 400. They also serve the Supervisory Printer (electric typewriter 603), which provides two-way communication between the supervisor and the system. The additional printer of 603 is provided for back-up.

The Card Readers 605 and 606, while used primarily for computer program input, are also interconnected with the system via the Input-Output Exchange 500 and Control 400 Modules, as is the Line Printer 604, used for the printout of log information, high precedence messages, faulty messages and, in general, all information which occasionally may be so voluminous as to render impractical its printout on the relatively low-speed electric typewriter.

Messages are transmitted from the switching center by reversing the input receiving path. The computer program recognizes from the queue table in the core memory module 204 the time for a new output message to be processed. The message is then transferred from bulk storage Disc Files 601 and 602 in 20-word clear-text blocks to core storage 200. Each block is duplexed and processed through or around each of the Cryptographic Processor Modules 1001, 1002, depending on whether it is destined for a protected or unprotected output line. The Data Demand Modules 801 and 802 check the clear-text identifying bit of each data word to prevent clear text from accidentally being transmitted on a protected line. The Data Buffer Module 901 receives its message from the two independent duplexed Data Demand Modules 801, 802 and checks to verify that the data received from each Data Demand Module is the same. If the data are different, an alarm is activated and the output of the Data Buffer Module 901 is locked until the operator corrects the malfunction.

Many methods of error detection are used throughout the Switching Center system. Checks performed by the hardware system include the following:

Detection of illegal computer instruction,
Parity checks on all data received from the Memory Modules, Detection of the lack of response from an addressed Memory Module, Detection of attempts by the computer Module to write data into a predesignated "out-of-bounds" memory area, Detection of arithmetic overflow, Automatic comparison of the duplexed Cryptographic Processor output messages.

These checks are all made continuously and unconditionally during computer operation.

Error checks are also performed continuously under control of the program system. The program sets up routing and queue controls and looks continuously for such errors as: more than a given number of groups per message, illegally used clear text, and too many characters without a space. Any message containing more than a predetermined number of groups is suspected of being garbled. Garble of pre-enciphered messages is detected by a consistency test for relative numbers of marks and spaces, or by other programmed statistical tests.

A check-sum is used with all Disc File storage operations. If the check-sum of a block retrieved from Disc File storage does not agree with the stored value, a second attempt to obtain a correct Disc File output is made by the program. If the repeated attempt fails, the program automatically switches to the alternate Disc File. If the same difficulty is found after the files are switched, the operator is informed of a probable failure in the computer module, and the two versions of the apparently erroneous block are compared by the back-up computer. If the two versions agree, the agreed-on version is printed for operator correction; if not, both versions are printed and the operator may choose the one to be corrected and transmitted. In any case, the program will not hang up when switching between the two files.

In addition to the above error detection schemes, several additional unique system routines are employed. Detailed descriptions of some of these routines follow the particular module to which they relate:

COMPUTER MODULE

Cross-monitoring routine

This routine operates only on the Computer Module being used for back-up. Its purpose is to monitor the operation of the active Computer Module in an attempt to detect failure. When an apparent failure is detected, the Computer Module comparison routine, discussed below, is initiated. During system operation, the back-up computer is, in effect, kept continuously aware of the routine being executed by the active module so that it can be ready to take over if needed.

Self-monitoring routine

Self-monitoring is performed whenever no other normal routine is being performed. Typical tests include such things as test computations and tests of Memory Modules. One pass is defined as a series of tests requiring little time, so that higher-priority routines are not unduly delayed.

Comparison routine

This routine is initiated automatically when the Computer Module monitoring routine detects an apparent error committed by the active Computer Module. Alternately, the operator may request execution of the Computer Module comparison routine when computer malfunction is suspected, or on a normal, preventive basis. When initiated, the routine is executed on both Computer Modules simultaneously. When operating in the Computer Module comparison routine, both Computer Modules process message inputs in parallel, each storing messages in different Disc Files. Both Computer Modules execute a series of test processes in parallel, printing their results for operator comparison. In addition, if the comparison is performed in response to a program-detected discrepancy, the nature of the discrepancy is printed by both modules so that the operator may be able to determine immediately which is the malfunctioning module. The bulk storage inputs set up by the malfunctioning computer module are replaced, from the point of comparison-initiation, with the more reliable set. Retransmission of affected output messages is then initiated.

Take-over routine

This routine for the switch-over between active and back-up Computer Modules may be initiated either by the operator or automatically. The operator requests switch-over in Computer Modules via the Supervisory Printer, causing the active module to interrupt the back-up module, thus effecting switch-over. Automatic switch-over occurs when the active Computer Module, recognizing an error in itself via the Computer Module self-monitoring routine or via an interrupt initiated by the computer's self-checking features, interrupts the back-up module with a take-over instruction, and stops itself. When initiated, the Computer Module take-over routine utilizes the results of the Computer Module monitoring routine to ascertain at which point of the processing to take over. The operator may instruct the computer to take over, effective at some other point.

MEMORY MODULE

Change-over routine

This routine is initiated by another routine on finding evidence of core-memory 200 failure, automatically upon automatic computer-detection of core parity failure, or in response to operator request. The contents of an active Memory Module M1 are transferred to the back-up module M5; indirect addressing tables are changed so that the new module is used. An appropriate print-out is then prepared.

CRYPTOGRAPHIC MODULE

Output comparison error routine

When the teletype output routine sets up a message output, the system automatically duplexes the output characters, sends the duplexed pair through the Cryptographic Processors in parallel, and compares the enciphered output before transmitting it. If a duplexed pair of outputs does not compare properly, the system automatically initiates the output comparison error routine via an external request interrupt. The function of this routine is to determine which of the pair of outputs is correct for transmission and which equipment should be turned down for maintenance. Both the clear and cipher characters are stored in core memory.

If, when the enciphered outputs differ, one character is identical to the clear character, the program can immediately determine which is correct by determining if enciphering should have been in operation on the pertinent output line. If neither is the same as the clear character, the program reproduces the enciphering function to referee the disagreement. Therefore, the output comparison error routine encompasses the logic of the Cryptographic Processors. When a decision is reached, the program automatically switches the output equipments to that the reliable equipment continues with the output, and the identity of the malfunctioning equipment is indicated to the supervisor. If invalid information is transmitted before the decision is made, a disregard signal is automatically set up by the output comparison error routine. In addition, it may be desirable for the parallel enciphering (and perhaps deciphering) functions to be performed on a routine basis to spot-check the automatic equipment.

In summary, then, message traffic is processed routinely as described in the following paragraphs and as illustrated in FIGURES 2A, 2B, 2C and 2D.

Figure 2A:
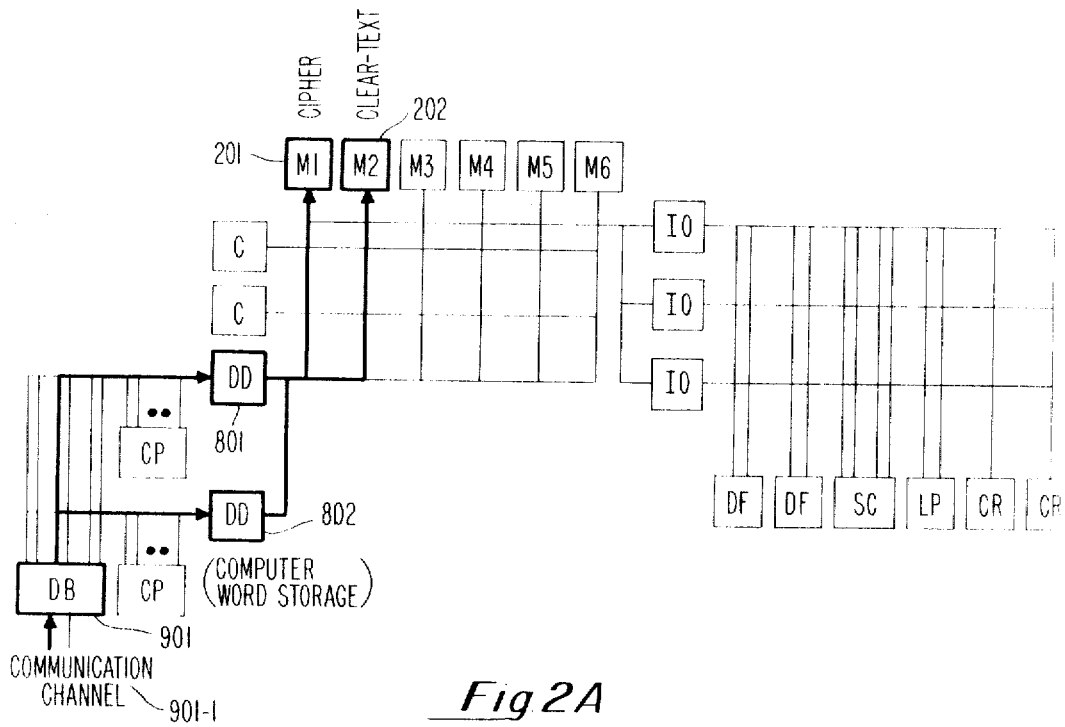

Refer to FIGURE 2A, where the input of a communication channel 901-1 is buffered through Demand Buffer 901 into both Data Demand Modules 801, 802. When a computer word is assembled therein, it is transferred to memory. If the input channel is ciphered information, the computer word is stored in Memory Module 201; if clear text, Module 202.

Figure 2B:
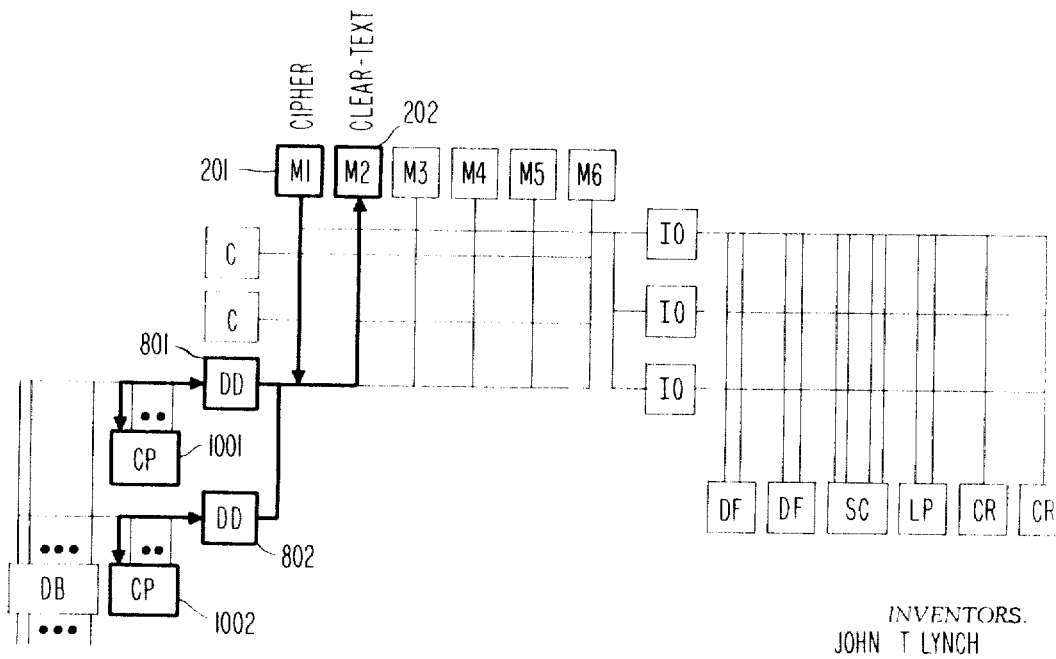

In FIGURE 2B, the traffic accumulated in ciphertraffic storage 201 is processed through Data Demand Modules 801 and 802 and Cryptographic Processor Modules 1001 and 1002 and restored in clear-text traffic storage module 202.

Figure 2C:
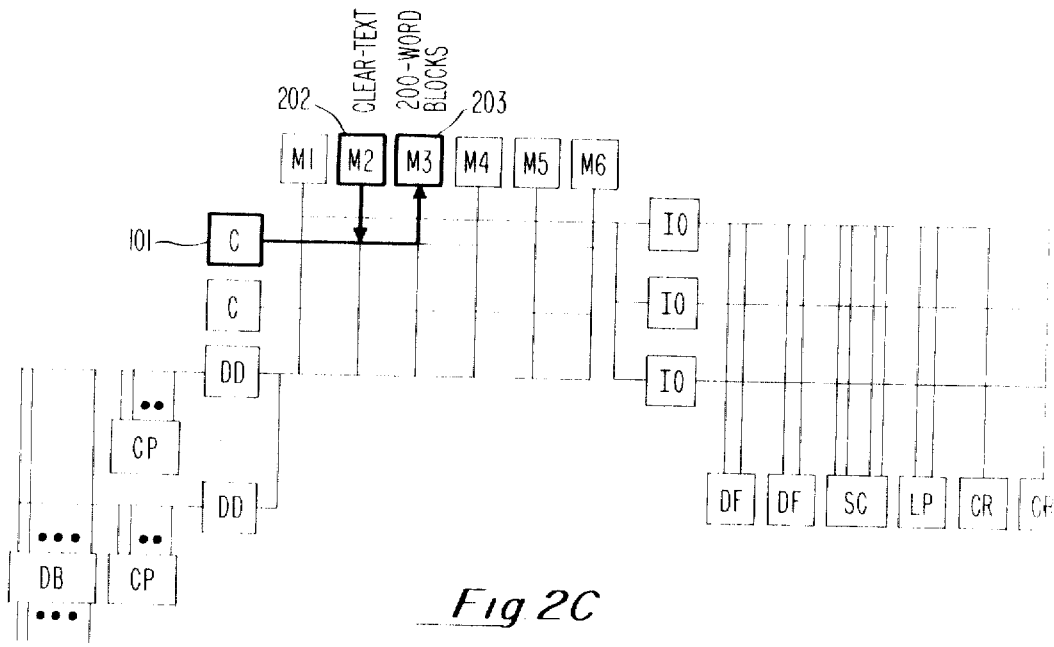

In FIGURE 2C, the traffic accumulated in clear-text traffic storage 202 is examined by computer 101 to determine if a message is in process. If blank, the contents are ignored; if the content contains header information, indicating the start of a message, message processing is initiated; if the block has continuing message content, it is processed by collecting the message into 20-word message blocks in sequence in Memory Modules 201 and 202. The computer 101 continually samples these 20-word memory locations and forms blocks of 200 words in Module 203 for transfer to Disc File 601 or 602.

Figure 2D:
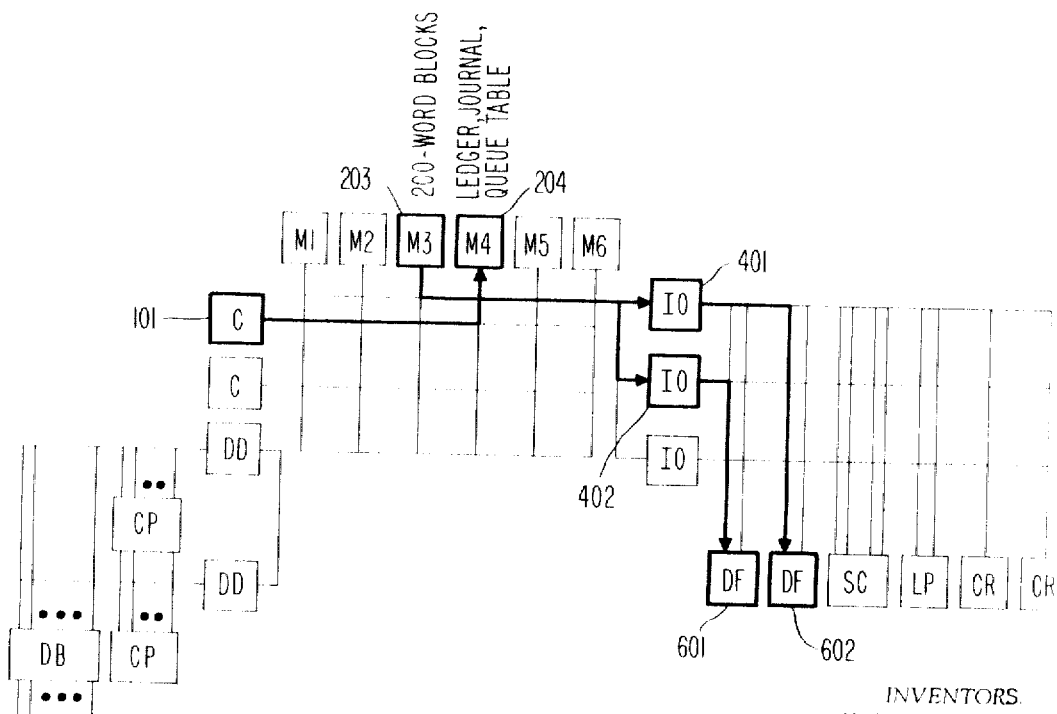

In FIGURE 2D, a message in 200-work block storage 203 is transferred to bulk storage Disc Files 601 and 602 pending transmission to its destination(s). Journal, ledger, and queue table information, together with bulk storage address of message is stored in Memory Module 204.

COMPUTER MODULES (100)

Each Computer Module 101 and 102 processes data and performs arithmetic operations in a synchronous manner at a 3-megacycle clock rate. A typical switching center application may contain from one to three Computer Modules. The configuration described here includes two Computer Modules; either module is more than capable of providing all the data processing requirements of the system, thus ensuring performance should one module fail. (A third Computer Module may be added to the growth bus at a future time if additional expansion capability is needed.) The following brief description is not meant to be explanatory of the unit operation, which, as previously mentioned, is the subject of a co-pending application. The following information is provided to more fully understand the switching center operation. Some of the important characteristics of the instruction repertoire provided by the computer module design are:

12-bit syllable instruction format, independent of word boundaries,
Fixed-point, floating point and logical instructions,
Character-field instructions,
Subroutine return-jump and interrupt return-jump instructions,
Repeat instruction,
3-fold indexing with any of 15 index registers,
Thin film circulating stack for high-speed access, permitting 0, 1, 2, 3 address operations,
Indirect addressing for access to separately allocated program, and data objects,
Processing rate up to 250,000 signal-address instructions per second.

Built into the addressing logic of the Computer Module is a unique addressing feature. This feature is automatic relative addressing which is essential for true parallel processing. With this feature, programs may be placed in any part of memory without modifying addresses at read-in time. Because the relative addressing feature automatically adds the base data address to all data addresses in the program, and adds the base program address to all branch addresses as part of the execution of program instruction, floatability of programs is automatic and routine.

The Computer Module consists of three functional areas: The arithmetic unit, the local storage section, and the control section. The first area, the arithmetic unit, is made up of three registers, A, B, and C, with associated controls. The second area is a set of 56 registers contained in a small thin-film magnetic storage. The third area is the control section which includes capabiilty for indexing, address accumulation, indirect addressing, and the command and subcommand matrices.

The memory input-output register is a 2-portion multipurpose register. To initiate a memory transfer, the memory address is transferred to the memory input-output register. The first portion of this address designates a specific Memory Module and is sent as D.C. levels to the central exchange circuitry of the memory bus. Address data for the Memory Module and information words entering the Computer Module from the Memory Module are transmitted through the second portion of the register, 12 bits at a time.

The computer interrupt system consists of a set of signals that causes the computer to interrupt its task, mark its place, and direct its attention to some urgent alternative routine, such as a real time process. The Data Processor is provided with a comprehensive interrupt system designed to facilitate the use of the computer in a real time system. If an external request occurs, the computer is interrupted and switches to the control mode. The computer automatically resumes normal operation at the point of interruption when the interrupt routine is completed. Interrupts may be from external requests, such as Input-Output Module service request, internal signal (real time clock, error alarm, etc.), or from other data processing modules in the system.

Each Computer Module has an interrupt register which can be set through the interrupt mask register. When a particular condition has set a one at some bit position in the interrupt register, a program interrupt occurs. This interrupt stops the program being executed, stores sufficient registers to allow continuation of the interrupted program at a later time, and transfers control to an Executive Program routine to service the interrupt. The interrupt system has a number of registers to provide storage for data in the operational registers in the event of an interrupt.

MEMORY MODULES (200)

The typical switching center described here requires approximately 20,000 words of core memory. Five Memory Modules, each with a storage capacity of 4096 computer words, satisfy this requirement. A sixth Memory Module is provided for back-up. The storage requirements for core memory are given in the following Table 1.

TABLE 1

*Core memory storage requirements*

| | Words |
|---|---|
| Program | 6,000 |
| Descriptors | 5,000 |
| Input buffer, clear text | 2,400 |
| Input buffer, cipher text | 400 |
| Output buffer, clear text | 1,600 |
| Output buffer, cipher text | 200 |
| Cryptographic Processor Module presets | 700 |
| Current journal | 200 |
| Ledger and queue table | 1,900 |
| Working area (heading scanning, etc.) | 500 |
| Available for bulk delay buffer | 1,580 |
| | 20,480 |

Each Memory Module contains a random access, linear select, ferrite core memory of 4096 words. Each word contains 48 information bits and one parity bit. The modules also contain independent read, write, and addressing circuitry, a data register and control and storage circuitry for resolving conflicts.

Read requests are made to a particular Memory Module by transmitting the 12-bit address of the desired word to the module. Less than one microsecond after the completion of this transmission, the desired word is in the module's data register; word regeneration and transmission of the word to the requesting module then begins in parallel. The complete cycle requires 4.33 microseconds. Likewise, the complete cycle for writing new information into memory, including the transmission to memory of both the word address and the data, also requires 4.33 microseconds.

In the event that two or more buses (or the devices terminating them) are to be connected to the same Memory Module, the conflict is resolved by a priority request granted immediately, and the lower priority requests held in abeyance and serviced immediately on completion of the higher priority request. Even in the event of the simultaneous occurrence of a number of conflicts, conflict resolution is performed in parallel with no lost time to any of the Memory Modules involved.

INPUT-OUTPUT CONTROL MODULES (400)

The Input-Output Control Module, functionally a unique data processor permitting multiple processing, controls the transfer and formatting of data between peripheral bulk storage devices 600 and core memory 200. In the switching system under discussion, three Input-Output Control Modules, 401, 402 and 403, are used to service two Supervisory Printers 603, two Disc Files 601, 601, two Card Readers 605, 606, and one Line Printer 604.

The peripheral devices 600 are matrically connected by Input-Output Exchange 500 with the Input-Output Control Modules 400 with each module capable of controlling any peripheral device. Thus, if any equipment on the exchange 500 fails, system operation continues. Of the 64-channel capacity of each Input-Output Module, six input channels and five output channels are required.

The number of Input-Output Modules required to service these record-and-store devices is primarily a function of speed and the need for simultaneous service. The data rates of the devices listed indicate that two modules are required to handle the total data traffic of the input and output exchange, 500. This is so primarily because of the two Disc File storage units 601, 602, on the exchange. Two Input-Output Control Modules 401, 402, permit simultaneous operation of these units. Operation of the other devices will be interleaved with Disc File operations, and can be handled by either control module. The third Module 403 is provided for back-up. Since all three modules are matrically connected to each of the peripheral devices, all three may be used actively at any time. If one module fails, however, the remaining two will be fully capable of handling the entire data transfer operations.

Two major registers of each Input-Output Control Module are the command descriptor register and the information assembly/distributor register.

The command descriptor register holds the command descriptors (instructions) which are to be executed by the Input-Output Module. Descriptor decoding and appropriate control logic is associated with this register as in the Computer Module. A command descriptor contains the current peripheral device number, operations code, record count, word count, and memory starting address.

The assembly/distributor register is utilized by the Input-Output Module for accepting data from the peripheral devices 600, assembling it into memory words, and transmitting the words to core memory 200; and for reading words from core memory, distributing them into 6-bit characters, and transmitting the characters to selected peripheral devices 600.

Communication with the Input-Output Control Modules 400 is accomplished through the Memory Modules 200. The execution of a "Transmit to I/O" instruction from a Computer Module to a Memory Module causes the transmission of a 48-bit command descriptor instruction from a Memory Module 203 describing the input-output operation to be performed to the lowest-numbered, nonbusy of the Input-Output Modules 400. Each time a full memory word is transferred, the transfer count is stepped down and the memory location count is stepped up. When an input-output operation is terminated, a result descriptor (instruction) is generated which contains the peripheral device designation, the last memory location transferred plus one, the number of locations left to be transferred, the operation being performed, and the reason for the termination. This result descriptor is made available to the system for further action by causing an input-output completion interrupt. Appropriate action is then taken by the program.

DATA BUFFER MODULE (901)

Figure 3:
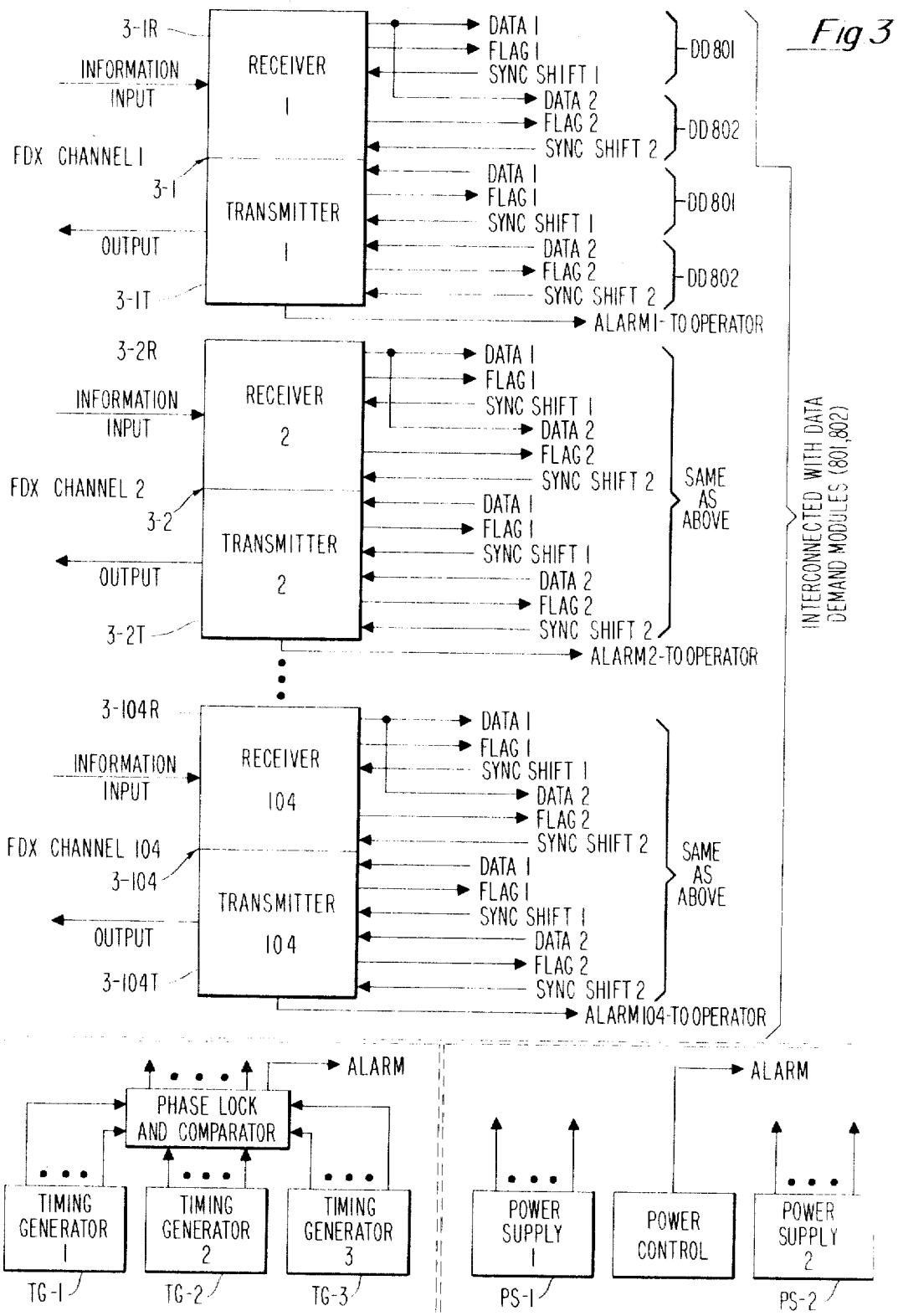
FIGURE 3 is an interconnection diagram of a typical Data Buffer Module shown at reference 901 in FIGURE 1.

The Data Buffer Module 901, shown interconnected in FIGURE 3, controls communication between up to 104 pairs of FDX lines and the Data Demand Modules (800) of the switching center. Duplexing of this module is unnecessary, since the circuitry for each line is independent, and the module is provided with spare plug-in submodules. The Data Buffer Module 901 accommodates any mix of standard signalling speeds and formats required. Due to its modular organization, the Data Buffer Module 901 is readily adaptable in the field to any additional speeds and formats.

The Data Buffer Module 901 contains all of the input sampling features found in conventional communication equipments. These include a synchronizing control to maintain line synchronism during periods of temporary line breaks and an input control to follow the input signal if its rate should drift. The processing of input data is accomplished on a bit of character basis at a much higher rate than the signalling speed used. This avoids momentary character pile-ups.

As shown on the right in FIGURE 3, the Data Buffer Module 901 is connected to the rest of the switching center via two parallel Data Demand Modules 801, 802, so that failure of either Data Demand Module will not affect system operation. Incoming traffic to Receiver 3–1R is sent to both 801 and 802 Data Demand Modules, and outgoing traffic to Transmitter 3–1T comes from both. Should outgoing traffic to the Transmitter 3–1T from the two Data Demand Modules 801, 802, differ, an Alarm 1 signal notifies the operator, and transmission on the affected channel is suspended pending operator intervention.

The many signal inputs to the Data Buffer 901 imposes severe phasing and time requisites. To satisfy the requirements of the various speeds, timing signals are supplied by three independent crystal-controlled timing generators, TG1, TG2 and TG3, in the lower left corner of FIGURE 3, whose outputs are compared by majority logic. If one of the timing generators is out of agreement, as determined by comparison, the fault is automatically indicated by an alarm signal, so that the generator can be removed for inspection and repair.

The lower right corner of FIGURE 3 illustrates two completely independent power supplies provided in the Data Buffer Module. Over-under voltage controls detect Power Supply 1 failure before power has deviated beyond allowable limits, and effect switchover to the standby Power Supply 2, with alarm indication to the operator.

FIGURE 4 shows a block configuration to indicate the Data Buffer Module accommodates up to 104 plug-in FDX receiver-transmitter submodules. Different plug-in submodules are used for various formats, but the Data Buffer Module accommodates any mix of units.

A typical FDX receiver-transmitter submodule used in the Data Buffer Module is shown in FIGURE 5. It is used on standard start-stop teletype lines. Taken in conjunction with FIGURE 3 showing the external input/output connections of all submodules of the Data Buffer Module, FIGURE 5 is a block diagram of the internal connections of one of these submodules. To illustrate the internal operation of a submodule in response to an external teletype signal, consider submodule 3–1 in the Data Buffer Module of FIGURE 3. The teletype information data input to the submodule 3–1 is connected to the receiver 3–1R. This is referenced as 5R–IN on FIGURE 5. Internally, the information data is relayed by TT4 relay 5R–10 to buffer 5R–12, where it awaits a delayed sampling signal before passing through BUFFER 5R–12 to be simultaneously coupled to the data 1 and data 2 lines for respective transfer to the Data Demand Modules 801 and 802.

The data is monitored by Mark/Space-Detector 5R–14 to determine the occurrence of a stop-baud-to-start-baud transition in the data train. The occurrence of such a transition creates a signal from the Mark/Space-Detector 5R–14 which is applied as a phase correction signal 5R–16 to reset the control counter 5R–18 to zero. This restarting of the counter cycle ensures a correct phase relationship at the start of each character. A timing generator signal is also connected to the counter 5R–18 which applies a pulse train having a repetition rate equal to 52 times the teletype character rate. It thereby divides each character into 52 intervals. A decoder 5R–20 provides an output pulse at 7 prescribed intervals of each character to the adjustable delay circuit 5R–22 which simultaneously activates 3 buffer devices 5R–12, 5R–24 and 5R–26 at an adjusted delay time after receipt of the output signal intervals. Buffers 5R–24 and 5R–26 provide respective Flag signals 1 and 2 to Data Demand Modules 801 and 802 to indicate a data sample readiness condition. Buffer 5R–12 also provides a one-bit buffer storage for the data information sampled by the delayed pulse.

Reference to FIGURE 6B will indicate that a start baud occupies the first seven intervals of a 52-interval character, followed by 5 information bauds of 7 intervals each. The next, or 42nd interval, starts a 10-interval stop baud to complete the 52-interval length character.

Returning to FIGURE 5, at interval 42, the decoder 5R–20 internally enables the Mark/Space-Detector 5R–14 to indicate to the phase correction device 5R–16, the presence of an external transitional signal to thereby restart a recycling of the counter 5R–18. When no external transitional signal occurs, an output signal at interval 52 from counter 5R–18 acts as an internal transitional signal. In this way, the internal transitional signals continue to recycle the counter to thereby reduce the possibility of false triggering by noise signals and to maintain synchronous operation in phase with the last external transitional signal during a line outage.

Transmitter 5T on the right-hand side of FIGURE 5 has a similar operation to the Receiver 5R on the left. However, it reverses the process. Data lines 1 and 2 feed information to Transmitter 5T for relay transmission to the teletype lines 5T-OUT from Data Demand Modules 801 and 802 respectively.

A control counter 5T–18 with its decoder 5T–20 and timing generator signals functions exactly as it did in the receiver 5R.

The information from Data Lines 1 and 2 is gated by Buffers 5R–12 and 5T–14 into comparator 5T–16 in response to the prescribed decoder 5T–20 output signals, to determine their equality. If they are the same, relay 5T–10 is activated to impose the data on the teletype lines. Decoder 5T–20 also applies the start and stop signals included in the teletype characters at prescribed start and stop intervals as shown in FIGURE 6B.

A more detailed diagram of the receiver station of this submodule is shown in FIGURE 6A. As previously noted, FIGURE 6B illustrates an information time cycle of the receiver submodule. Both figures are incorporated in the following explanation.

In FIGURE 6A, information from the teletype line 6R–IN is buffered by the solid-state teletype relay 6R–10, which can be wired for neutral or polar signalling at any signalling level. A Mark/Space-Detector 6R–14 serves to detect the signal level transition from the stop baud 6R–52 to the start baud 6R–50 and is used to phase-correct or reset the control counter 6R–18. Control counter 6R–18 is fed by a timing generator signal 6–100 at a frequency appropriate to the speed of the teletype line. The timing generator signal has a rate equal to 52 times the character rate to deliver 52 equidistant pulses per teletype character. As shown in FIGURE 6B, the control counter 6R–18 divides these 52 equal intervals into a seven-interval start baud 6R–50, five information bauds of seven intervals each, namely: information baud 1, intervals 8–14; baud 2, intervals 921; baud 3, intervals 22–28; baud 4, intervals 29–35; and baud 5, intervals 36–42; and finally, one ten-interval stop baud 6R–52. Output signals, therefore, emanate from the control counter 6R–18 at intervals 7, 14, 21, 28 and 35. These signals sequentially activate OR gate 6R–20, before being delayed by a variable delay circuit 6R–22. The delay circuit 6R–22 has a delay range of 2 to 5 pulse intervals. Since each information baud has a 7-interval length, the earliest a pulse output from delay circuit 6R–22 may occur is 2 intervals after the input pulse from OR gate 6R–20; the latest, 5 intervals. Thus, an input pulse at interval 7, with the range delay control set at 2, will cause a delayed output pulse at interval 9. For a range setting of 5, the delayed output pulse occurs at interval 12. A small additional fixed delay is imposed by delay circuit 6R–22A, upon the output of the range control circuit 6R–22. Three bistable devices, 6R–24, 6R–26 and 6R–28, act as one-bit storage buffers at the output of the receiver 6R. The bistable conditions of each device are used as a binary output signal. Bistable devices 6R–24 and 6R–26 indicate a binary 1 when activated by the delayed interval signals from 6R–22A. The binary 1 output signals from these devices are specified as Flag signals 1 and 2, respectively, from bistable devices 6R–24 and 6R–26.

The Flag signal 1 is coupled to Data Demand Module 801, while Flag signal 2 goes to Data Demand Module 802. The presence of a binary 1 on the Flag signal lines indicates to the Data Demand Module a need for service by the channel in which the receiver 6R is located. This is also known as the input ready condition.

Each Data Demand Module, 801 and 802, will return a Flag reset signal, herein called a "sync shift signal," to the corresponding bistable Flag signal circuit when the request has been serviced by the Demand Module.

Data lines 1 and 2 are connected to bistable device 6R–28.

Data is available only when a binary 1 is indicated by the bistable device 6R–28. The AND gate 6R–12 is operative only in the presence of simultaneous signals from the teletype relay 6R–10 and the delta ($\Delta$) delay circuit 6R–22A. Prior to the occurrence of the output signal from the additional delay circuit 6R–22A, variable delayed output signal from delay circuit 6R–22 causes the bistable circuit 6R–28 to reset to a binary 0 output to ensure proper data phasing.

After being reset to binary 0, the bistable device 6R–28 is activated to binary 1 when a signal from AND gate 6R–12 is caused by the simultaneous presence of a signal from teletype relay 6R–10 and the sampling signal from the additional delay circuit 6R–22A.

The binary 1 output data signal from device 6R–28 is sent to both Data Demand Modules, 801 and 802, on Data 1 and Data 2 lines respectively when the channel is serviced by the demand modules in response to the Flag 1 and Flag 2 signals. Sync shift signals 1 and 2 must reset their respective Flag circuits prior to the next sampling.

DATA DEMAND MODULES (800)

Figure 7:
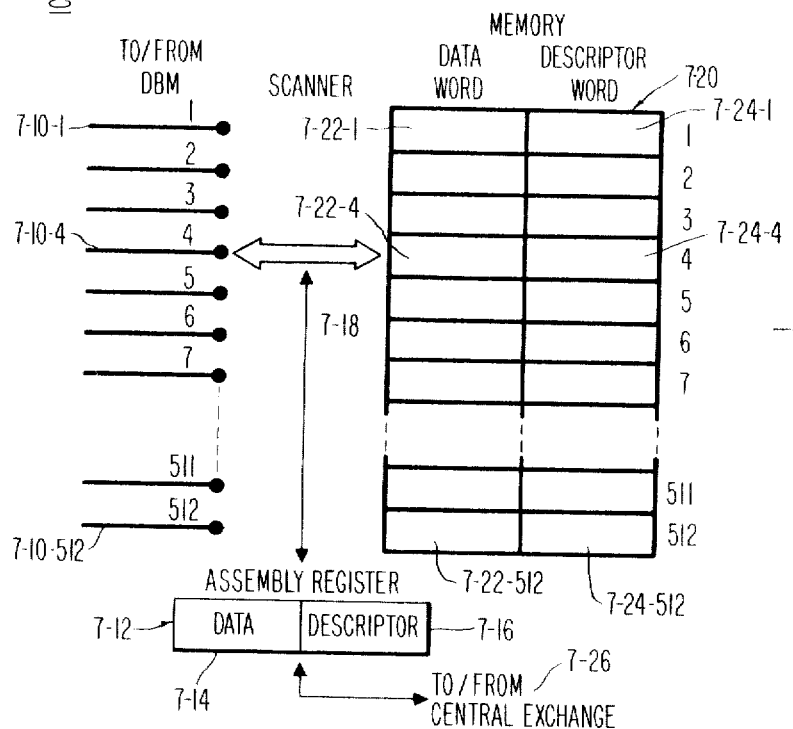
FIGURE 7 is a representation of the Data Demand Module scanning its 512 lines.
Figure 8:
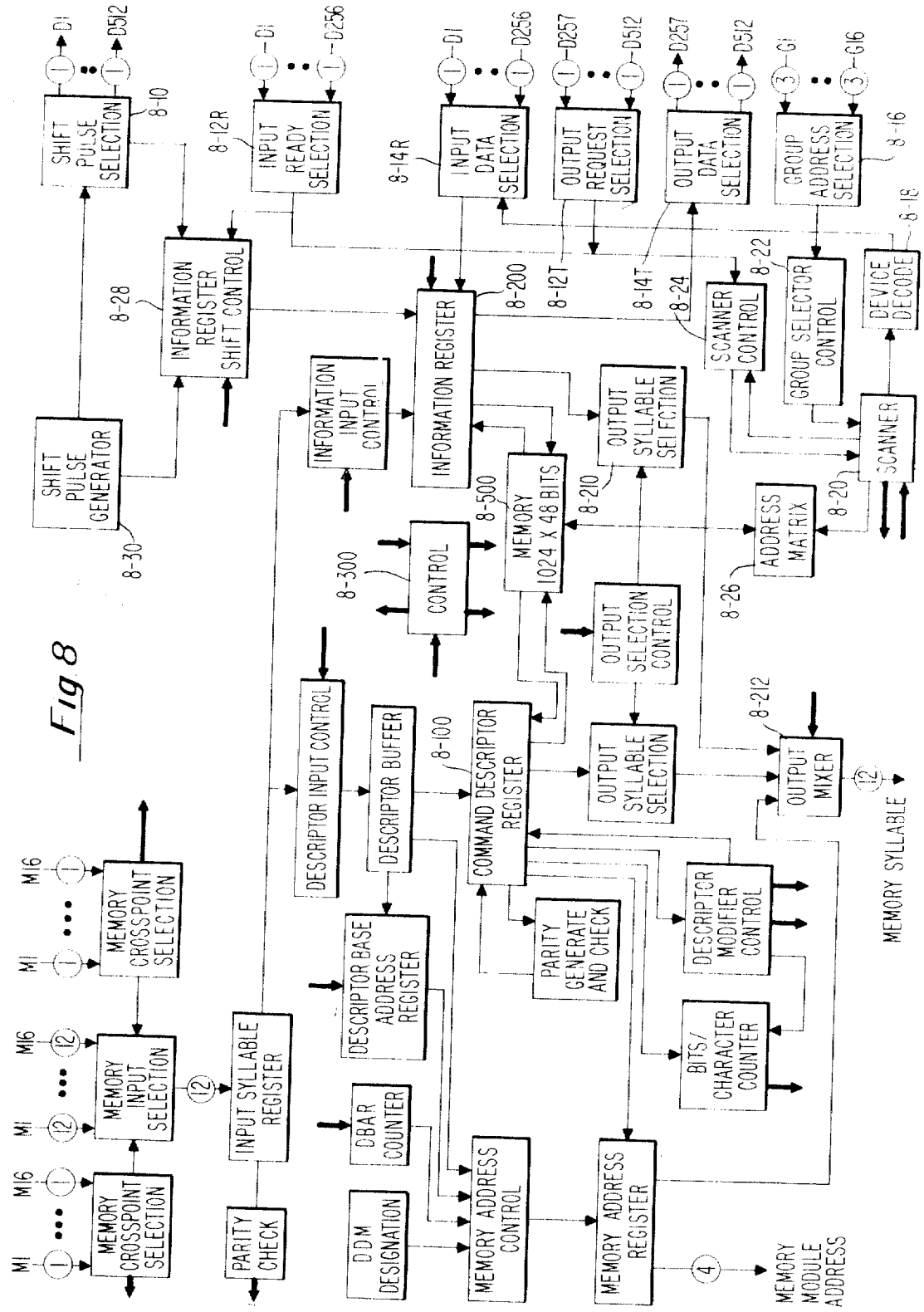
FIGURE 8 is a block diagram of the Data Demand Module shown in FIGURE 1 as reference 800 of the overall system.

The Data Demand Modules are shown pictorially in FIGURE 7 and more particularly in FIGURE 8. They control the exchange of data between Memory Modules 200 and up to 512 real time data links as well as devices such as Cryptographic Processor Modules 1001, 1002. They perform the function of providing the interface between the synchronous data processor and the asynchronous real-time communication network. They also act as a speed buffer for the high-speed data processor; low data-rate links, such as teletype, are collected and temporarily stored by the Data Demand Modules 800 and transferred to the data processor at a 3-megacycle rate.

A Data Demand Module requires 14 to 30 microseconds to service a request by a data channel. During the 30 microseconds service time, 48 bits (bauds) of information can be collected; over 250,000 teletype characters per second can thus be serviced in real time.

In the application under consideration, two Data Demand Modules, 801, 802, are necessary to meet the system outage requirement. Each module services all 100 FDX channels on the system, as well as the 32 channels associated with the Cryptographic Processor Module. Thus, each Data Demand Module has a growth capability of 350 channels.

The general organization of the Data Demand Module is shown in FIGURE 7. Central to the module is the scanner 7-18, which continuously scans all input and output channels sequentially, seeking those requiring service. Each channel is serviced in turn as required, either by the receipt or transmission of the appropriate data over the requesting channel. A 1024-word memory 7-20, devoting two words of storage to each of 512 channels, is also fundamental to the operation of the module. One word, the Descriptor Word 7-24, provides the appropriate command to the Data Demand Module for a channel; the other, the Data Word 7-22, provides a one-computer-word buffer for the assembly or distribution of data exchanged between the Memory Modules and the channels.

Data transmission between the Data Demand Modules and channels served is effected in serial format to minimize the extent and complexity of system interconnection cabling. Each input or output data channel requires that a buffer register of the requisite word length for that particular channel be associated with the respective device.

Under program control, a list of command descriptors (instructions) is loaded initially into the Data Demand Module. Thereafter, command descriptors are reloaded, or modified and reloaded, or new descriptors loaded individually as the program requires them.

Referring to FIGURE 7, a typical input operation for servicing a communication channel is executed as follows:

While scanning, an input ready signal is sensed by scanner 7-18 input channel 7-10-4; scanning stops. The command descriptor word 8-24-4 and partial data word 7-22-4 assembled so far are extracted from Data Demand Module Memory 7-20 and placed in the assembly register 7-12; scanning is resumed.

A sync shift pulse is transmitted to the input channel 7-10-4, and the incoming information baud is accepted into the Data Demand Module Assembly register 7-12. The baud received is appropriately inserted into the data assembled previously (if any).

These two steps are repeated for the required channel word length (baud or character).

The command descriptor and reassembled data word contained in the register 7-12 are restored in Data Demand Module memory 7-20.

If the scanner has not already stopped at the next service request channel, the Data Demand Module idles until a request is acknowledged.

When 48 bauds of data are collected in this manner to form the 48-bit computer word, the Data Demand Module transfers the word from memory 7-20 to an assigned location in the system Memory Modules without interrupting the computer. This assigned location is part of the command descriptor.

Again referring to FIGURE 7, a typical output operation for servicing a communication channel is executed as follows:

While scanning, a baud or character request signal is sensed by scanner 7-18 on an output channel of 7-10; scanning stops.

The command descriptor 7-24 and partial data word 7-22 distributed so far are extracted from the Data Demand Module Memory 7-20; scanning is resumed.

The baud or character to be transmitted is separated from the partial data word in the assembly register 7-12.

The separated baud or character is transmitted to the buffer register 5T-12 of the output channel transmitter of FIGURE 5.

The command descriptor and the remainder of the data word are restored in the memory of the demand module.

If the scanner has not already stopped at the next service request channel, the Data Demand Module idles until a request is received.

When the 48 bauds have been transmitted to the Data Buffer Module, the Data Demand Module collects another 48-bit computer word from system core memory via the central exchange 7-26 in time to honor the next request for service by that particular channel. The Data Demand Modules 801 and 802 collect this word from a location in the system memory without interrupting the computer; the address of the location is part of the command descriptor for that channel.

Referring in particular to FIGURE 8 wherein is shown a block diagram of the Data Demand Module, it is seen that the left-hand portion of the figure, which contains the information flow and its control to and from the system core memory, is identical to the Input/Output Control Modules 400. These have been previously described in a cursory manner in the present application, but as mentioned at that time, a co-pending application on a Data Processor Input Output Control System, S.N. 241,421, was filed on Nov. 30, 1962, which describes in detail this portion of the present module. It is the right-hand portion which is vital to the present disclosure and which will now be explained.

Consider that information has been received by the message center and the receiver portion of the sub-module in FIGURE 5 has transmitted a Flag 1 signal to the Data Demand Module 801 of FIGURE 8 that input information is ready to enter. For purposes of explanation the 512 lines of the module have been specified as 256 input lines and 256 output lines. The Flag 1 signal from the Data Buffer Module is received on one of the 256 input ready lines of the Input Ready Selection Circuits 8-12R. A circuit scanning device 8-20, which is continuously checking the lines, senses the input ready signal. This inactivates Scanner Control 8-24 and activates Information Register Shift Control 8-28.

The Scanner Control 8-24 addresses the selected lines 8-26 in the memory 8-500.

The Information Register Shift Control 8-28 causes the Information Register 8-200 to be shifted until it is connected to the memory location of memory 8-500 corresponding to the line being serviced, and to receive the contents of that selected location. The Scanner 8-20 resumes its servicing chores. The Central Control 8–300 of the Data Demand Module at this time enables a shift pulse from Generator 8–30 to be returned to the selected input line by the Shift Pulse Line Selector 8–10. This is the Sync Shift 1 signal indicated on the receiver/transmitter subassembly of FIGURE 5. The receiver, upon receipt of the Sync Shift 1 pulse, imposes the input information to the Data 1 line. All Data 1 lines from the receivers of all 104 submodules are terminated at the Input Data Selection Circuits 8–14R. The input information is connected through the Data Selector 8–14R to the Information Register 8–200. It is combined with the information presently contained in the demand module memory for that line. After modification, the information is returned by the Register 8–200 to the original memory location in 8–500. When the memory 8–500 contains a full word of information (48 bits), it is transferred through the register 8–200 and returned to the system core memory modules 200 of FIGURE 1 through the output Syllable Selection device 8–210 and Output Mixer 8–212.

Output messages are handled in a similar manner except in a reverse fashion. An output request signal is received from a transmitter portion of a submodule, i.e., Flag 1 of FIGURE 5 transmitter submodule 5T. The Scanner Control 8–24 senses the output request on 8–12T and stops the Scanner 8–20. The Information Register Shift Control 8–28 is also activated to receive the memory contents 8–500 of the scanner addressed 8–26 line into the register 8–200. A sync shift signal is returned from Generator 8–30 via Shift Selector 8–10 to the buffer 5T–24 of the transmitter 5T in FIGURE 5. The output information in the register 8–200 is fed to the output data selector 8–14T for transfer to the transmitter buffer 5T–12.

Capability is also provided for servicing 128 channels in 16 groups of eight devices each, as shown in FIGURE 8 at 8–16. This option is intended for use by devices such as the Cryptographic Processor Modules 1001 and 1002, that have multichannel input-outputs and that can communicate with the Data Demand Modules 801, 802 by time-sharing a single physical channel. With this option, the multichannel device (Cryptographic Processor) must supply the Data Demand Module with a 3-bit flag address, that is, the number of the channel actually requesting within the group. A device decoder 8–18 and a group selector 8–22 are necessary for respective input and output operation with this option.

CRYPTOGRAPHIC PROCESSOR

It should be noted that details of a Cryptographic Processor Module are available via the cognizant Government agency. However, the present invention concept does not require nor depend on a particular unit, but is rather an improvement in their utilization. Analysis of the characteristics of a commonly used cryptographic terminal equipment indicates that duplexed Cryptographic Processor Modules, capable of performing the cryptographic functions for up to 1000 FDX teletype channels, occupy one standard cabinet of the data processing system.

SUPERVISORY CONSOLE (603)

The modular system has a Supervisory Console positioned with the recording devices 600 which provides supervisory control of the system. This console is extremely simplified because it is supplemented by the indicators and controls contained on the maintenance panels of the individual modules of the system. There are also two supervisory printers associated with the Supervisory Console 603.

Supervisory Printer

The supervisory printer is part of the Supervisory Console (603). Essentially an electric typewriter, it serves as an input keyboard as well as a supervisory printer. An operator may enter data into the system by initiating a request for a "read from keyboard" operation, activating an interrupt to a Computer Module 101, 102; the operator enters his data when he receives computer acknowledgement.

The computer may initiate printing of alphanumeric data from the system on the supervisory printer to furnish information and instructions to the operator.

One supervisory printer will provide the supervisor with responses to queries regarding system status, log information, etc. The other printer is effectively a backup for the first. Since the computer program controls the printer operations, it may substitute or combine the printer functions as required. The speed of each unit is 9.5 characters per second when reading punched paper tape and 9.8 characters per second under computer control.

A paper tape punch and a paper tape reader are included with each supervisory printer to enable off-line preparation of punched paper tape and to allow the operator the option of typing manually or reading a punched tape. Automatic carriage return prevents overtyping at the end of a line.

EQUIPMENT STATUS DISPLAY

A number of status indicators are displayed on a status panel provided on the Supervisory Console 603. This status panel indicates, for each individual module in the system, whether it is on-line (green), standby (white), out-of-service (amber), or malfunctioning (red). The supervisor may change the status of any module by requesting the executive program, via the supervisory printer, to substitute another module for it. If, for instance, it is desired to remove Memory Module 202 for maintenance, the executive program is so advised, and automatically substitutes the then standby Memory Module for whatever functions were performed by Memory Module 202. When the substitution is completed, the indicator for Memory Module 202 changes from on-line to standby, and the supervisor may now operationally remove it from the system.

Additional displays include a digital clock giving Greenwich mean time (GMT) to the nearest minute, and in-limits indicators for primary and standby power, temperature, and humidity.

CIRCUIT STATUS DISPLAY

A circuit status panel is also displayed on the Supervisory Console 603. It indicates the status of each individual communications circuit by the activation of various colored lamps, as follows:

Green—In service, protected,
Amber—In service, unprotected,
White—Out of service, scheduled,
Red—Out of service, nonscheduled,
Flashing Red—Synchronization failure.

INQUIRIES AND INPUTS

The supervisory printer further enables the supervisor to originate, and receive replies to, inquiries regarding system status, traffic conditions, and log information. It is also used for entering into the system the following information:

Routing program changes,
Correction of errors in messages,
Initiation of transmissions or retransmissions,
Initiation of test messages (Fox),
Resetting of channel sequence numbers,
Routing plan modifications,
Alternate routing information,
Additions, deletions, or changes in circuit terminations,
Modification of message headers and message processing procedures.

ALARMS

The Supervisory Console contains a separate indicator panel to display traffic alarms. The following functions are included in this panel:

High-precedence message in switching center,
Traffic for closed station,
Overdue message in switching center,
Security violation, incoming message,
Attempted security violation, outgoing message,
Attempted security violation, internal transfer,
Crypto alarm,
Channel sequence number error or channel check error,
Internal parity error,
Improper header, incoming message,
Suspected garbled header, incoming message,
Suspected garbled message, incoming.

Details concerning the alarm being displayed are simultaneously printed out on the supervisory printer.

LINE PRINTER (604)

While physically a separate unit, the high-speed Line Printer 604 is closely associated with the Supervisory Console 603. Its primary function is to print out items which, because of their length, would unduly tie up the Supervisory Printer. Such items include the retrieval from bulk memory 601, 602, Disc Files of log information from the 30-day station log, retrieval of full messages from the 3-day message log, unacceptable message headings, high-precedence messages, contradictory comparison messages, and messages addressed to the system supervisor.

Only one Line Printer is required. In event of failure, the printout will temporarily be assigned to the slower speed supervisory printers.

The Line Printer 604 is a high-speed electrostatic printer capable of printing five lines per second at a sustained rate. A line of print contains up to 72 characters.

The printer accepts six-bit alphanumeric characters at rates up to 500 per second. A high-speed electronic column switch determines the sequential operation of 72 print heads so that printing occurs serially across the page. The column counter is reset to zero by the carriage return character or signal, and a line feed character or signal advances the paper.

In the electrostatic process, print heads deposit electrostatic charges on the surface of coated paper in the form of the character to be printed. The image is developed with powdered ink which adheres to the charged areas, and the ink is fixed by a heated roller. Since this type of printing operation involves very few moving parts, operation is highly reliable and very little maintenance is required.

DISC FILE STORAGE UNITS 601, 602

The Disc File storage unit is a high-capacity, random access memory using storage discs. It has a modular organization, with a single unit capable of incorporating any number of modules up to a total of 24 discs. The requirements for Disc File storage are estimated in the following table.

DISC MEMORY STORAGE REQUIREMENTS

|  | Words |
|---|---:|
| Three-day message store | 4,000,000 |
| Journal | 24,000 |
| 30-day logging store | 6,400,000 |
| Program (backup) | 6,000 |
| Index to precedence table (backup) | 20,000 |
| Total | 10,450,000 |
|  | 1 disc file |
|  | (21 discs) |

Storage capacity of a single disc is approximately 500,000 system words (48 bits); storage for the 10,450,000 words required by the system under discussion thus dictates a 21-disc storage unit. Three additional discs can be added in the field for expansion.

The discs presently utilized are 39 inches in diameter, rotating at 900 revolutions per minute. A disc surface is organized into six zones with 128 data tracks per zone. There are 768 data tracks per disc surface. Six hydraulically-positioned read-write heads are provided per disc surface. Average access time is approximately 65 milliseconds.

CARD READERS 605, 606

Two 200-card-per-minute Card Readers, one active and one backup, are provided among the recording peripheral devices 600 for the insertion of the message processing program into the system. Standard 80-column cards are read column serially by photoelectric sensing. Invalid character detection during card reading is provided.

The capacity of both the input hopper and the output stacker is 500 cards; however, cards may be added or removed while the device is operating. Built-in card storage racks are provided for convenient card access.

While there have been shown and described and pointed out the fundamental novel features of the invention as applied to the preferred embodiment, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. A store and forward message switching center comprising, in combination, a totally modular data processor having a plurality of identical memory modules, and a plurality of identical processing modules interconnected to a matrically arranged central interchange for simultaneous intercommunication therebetween, a plurality of identical input/output control modules each connected to all for selective communication with any of said identical memory modules through said central interchange, a plurality of peripheral recording and storage devices interconnected through a matrically arranged input/output interchange to said input/output control modules for simultaneous intercommunication therewith, a plurality of identical data demand modules individually connected to all for selective communication with any of said memory modules through said central interchange, a plurality of identical data buffer modules interconnected through a matrically arranged data demand interchange to said data demand modules for simultaneous intercommunication therewith, each of said buffer modules interconnecting a plurality of message communication lines to said data demand interchange, each of said pluralities of modules of said message switching center including at least one additional module in excess of system operating requirements to thereby provide a message switching center having the reliability achieved by a switching system with a complete standby system without the equipment redundancy and inherent switchover requirements of a complete standby system.

2. The message switching center as described in claim 1, wherein the excess backup module included in each plurality of modules is connected to actively participate in system operation to thereby provide additional availability of its function to the system operation.

3. A store and forward message switching center comprising, in combination, a totally modular data processor having a plurality of identical memory modules, and one or more identical processing modules interconnected to a matrically arranged central interchange for simultaneous intercommunication, one or more identical input/output peripheral control modules also connected to said central interchange for selective communication with any of said identical memory modules, a plurality of peripheral recording and storage devices connected to said peripheral control modules through a matrically arranged input/output interchange for separate simultaneous intercommunication with said peripheral control modules, one or more identical data demand modules also connected to said central interchange for selective communication with any of said memory modules, one or more data buffer modules interconnected through a matrically arranged data demand interchange for separate substantially simultaneous intercommunication with said data demand modules, each of said buffer modules interconnecting a plurality of message lines to said data demand interchange, said data demand module capable of switching itself for sequential connection to the lines of said data demand exchange at a cycling rate greater than the message rates at said message lines, whereby adjacent portions of each message are transferred between said data demand interchange and said data demand module on successive switching cycles by said demand module.

4. A store and forward message switching center as set forth in claim 3, wherein each of said data buffer modules includes a plurality of interchangeable message line buffers, said plurality corresponding to said plurality of message lines.

5. A message switching center as set forth in claim 4, wherein said plurality of line buffers include message input and message output line buffers.

6. The store and forward message switching center set forth in claim 3, wherein each of said data demand modules includes a scanning means and a high speed line organized storage means, said scanning means suquentially connecting the line locations of said high speed storage means to the lines of said data demand interchange, whereby messages are transferred between said message lines and storage means by the data demand interchange and said scanning means to thereby enable a concurrent assimilation of plurality of messages in the line locations of said storage means.

7. The store and forward message switching center as set forth in claim 6, wherein the scanning means of said data demand modules includes a bidirectional information transfer means to temporarily store and assemble scanned portions of low speed message information for transfer to said storage means in one direction and to temporary store and distribute portions of information in said high speed storage means for transfer to a scanned communication line in the other direction.

8. The message switching center as set forth in claim 7, wherein said bidirectional information transfer means is a storage register operative in a first direction to receive and transfer message information from input line buffers into corresponding memory line locations and operative in a second direction to receive and transfer information from said memory line locations to corresponding output line buffers.

9. A store and forward message switching system for use with a modular data processing system comprising a plurality of data demand modules commonly connected between said data processing system and a plurality of message communication line buffers, each of said line buffers having a data and a data-request storage device and a common sampling means which is responsive to the message information to be switched and operative to activate said storage devices, each of said demand modules having a cyclic scanning means sequentially connected to said storage devices, a storage register connected to said scanning means and a line organized memory means having a plurality of line locations at least equal in number to said plurality of message line buffers, said storage register correspondingly and sequentially connected to said plurality of line locations of said memory means, said scanning means responsively halted when connected to an activated data request storage device, said halting causing a transfer of information between said memory line location and the corresponding line buffer.

10. A store and forward message switching system for use with a modular data processing system comprising a plurality of data demand modules commonly connected between said data processing system and a plurality of message communication lines, each of said message lines having associated with it a line buffer, each of said line buffers having a data storage device and a service request indicator responsive to the message line information, each of said demand modules having a sequential scanning means connected between the service request indicators of said communication line buffers and a high speed storage means, said scanning means sequentially connecting said data storage devices of said line buffers to said high speed storage means when service is requested by said indicator, said high speed storage means interleavedly assembling received input message information for subsequent forward transfer to the memory of said data processing system and interleavedly separating transmitted output information for subsequent transfer along selected lines of said plurality of message communication lines whereby a plurality of messages from and to said lines are concurrently assimilated by said high speed storage means of said demand modules.

11. A store and forward message switching system for use with a modular data processing system comprising a plurality of data demand modules parallel connected together and commonly connected between the memory modules of said modular data processor and a plurality of incoming and outgoing message communication lines, each of said message lines having associated with it a service requesting device, said service requesting device activated by incoming message lines requiring service and by outgoing lines requiring information, a requesting device scanner actively sweeping the outputs of said devices and responsively deactivated by said requesting device in its activated condition, said demand module further including an assembly and distribution register and a line organized memory means, said deactivation of said scanner when connected to an incoming message line causing the information contained in the memory line location and the information on the corresponding incoming message line of said requesting device to be transferred to and combined in said register, the combined information content of said assembly register being returned to its original memory line location, said deactivation of said scanner when connected to an outgoing line causing the transfer of the memory line information to the register, wherein the information required by said line is separated from said memory line information and distributed to said outgoing line, the remaining information being returned to the original line location of said line organized storage device, whereby a plurality of incoming and outgoing messages are concurrently assimilated and disseminated in said line organized memory device by said scanning device and register.

12. A store and forward message switching center comprising a modular data processor having a plurality of identical memory modules and a plurality of identical computer modules interconnected through a matrically arranged central interchange such that any computer module may have access to any memory module, said data processor also having a plurality of input/output control modules and a plurality of data demand modules, the modules of each selectively connected to have access to any memory module, a plurality of input/output record and storage peripheral devices connected through a matrically arranged input/output interchange to said plurality of input/output control modules, and a plurality of buffers connected through a matrically arranged data demand interchange to said plurality of data demand modules, said plurality of buffer modules connecting the message communicating lines of said center into the matrically arranged data demand matrix, each of said data demand modules including a storage means having an allocated portion for each of said lines, a scanning means connected to sequentially scan the message communicating lines and their allocated storage portions simultaneously, and an assembling and distribution register connected to said scanning means to receive and combine line input information with stored information presently in its allocated storage portion and further to separate and transmit line output information from stored information presently in its allocated storage portion, said data demand module transferring the input contents of a filled storage portion at the clock rate of said data processor into selected memory modules, and filling empty output storage portions having output from said memory modules at said clock rate, whereby the message data is communicated between said buffer and demand modules at a speed as determined by the message transfer rate per line and the number of said communicating lines.

13. An automated secure message switching center comprising, in combination, a totally modular data processor having a plurality of identical memory modules, and a plurality of identical processing modules interconnected to a matrically arranged central interchange for simultaneous intercommunication therebetween, a plurality of identical input/output control modules also connected to said central interchange for selective communication with any of said identical memory modules, a plurality of peripheral recording and storage devices interconnected through a matrically arranged input/output interchange to said input/output control modules for simultaneous intercommnication therewith, a plurality of identical data demand modules also connected to said central interchange for selective communication with any of said memory modules, a plurality of identical data buffer modules interconnected through a matrically arranged data demand interchange to said data demand modules for simultaneous intercommunication therewith, each of said buffer modules interconnecting a plurality of message communication lines to said data demand interchange, and one or more cryptographic processing modules serially connected to each of said data demand modules through said data demand interchange, each said cryptographic module sequentially receiving input and output switching center messages from said data demand module along the lines of the data demand interchange and sequentially transmitting translated versions of the received messages to said demand module through the demand interchange, whereby the sequential operation of said cryptographic module necessitates a single transmitting and receiving means associated therewith.

14. The automated secure message switching center as set forth in claim 13, wherein each said cryptographic processor module includes enciphering and deciphering means, said enciphering means receiving clear text messages from said demand module for translation into coded text messages before return transmission to demand module and said deciphering means receiving coded text messages for clear text, return transmission to said demand module.

15. The automated secure message switching center as set forth in claim 13, wherein said cryptographic processing module includes a scanning means in association with said single receiving and single transmitting means, said scanning means sequentially connected to the lines of the data demand interchange associated with said cryptographic processor module.

16. An automated secure message switching center as set forth in claim 15, wherein said cryptographic processor module includes a receiving and a transmitting device connected to corresponding lines of said data demand interchange, a line buffer commonly associated with said receiving and transmitting devices for alternate connection thereto, and a translating means connected to simultaneously receive information for translation from said line buffer, when said line buffer is connected to said receiving device, and connected to simultaneously transfer said translated information into said common line buffer when said line buffer is connected to said transmitting device, whereby said information is parallel processed with and serially processed without said cryptographic processor.

17. A store and forward automated secure message switching center comprising: a modular data processor having a plurality of identical memory modules and a plurality of identical computer modules interconnected through a matrically arranged central interchange such that any computer module may have access to any memory module, said data processor also having a plurality of input/output control modules and a plurality of data demand modules, the modules of each connected to said central interchange to have selective access to any memory module, a plurality of input/output record and storage peripheral devices connected through a matrically arranged input/output interchange to said plurality of input/output control modules, a plurality of message buffer modules and one or more cryptographic processing modules connected through a matrically arranged data demand interchange to said plurality of data demand modules, said plurality of buffer modules connecting the message communicating lines of said center into the matrically arranged data demand matrix and said cryptographic modules connected between the output and input lines of said demand matrix from said demand modules, said data demand modules including a storage means having an allocated portion for each of said lines, a scanning means connected to simultaneously scan the message communicating lines and their allocated storage portions, and an assembling and distribution register connected to said scanning means to receive and combine line input information with stored information presently in its allocated storage portion and further to separate and transmit line output information from stored information presently in its allocated storage portion, said data demand module transferring the input contents of a filled storage portion at the clock rate of said data processor into said memory modules, and filling emptied storage portions on said output lines from said memory modules at said clock rate, whereby the input message information is communicated between each of said buffer modules and its allocated storage portion in said data demand modules at a speed as dictated by said communicating lines and further whereby said message information is communicated between said data demand modules and said memory modules at the operating clock speed of the modular data processor.

18. The message switching center as set forth in claim 17, wherein each said cryptographic module is a bi-directional translating feedback device receiving from the output lines of said data demand matrix clear and coded text messages and respectively transmitting onto the input lines of said matrix correspondingly coded and clear text messages whereby the output of said data demand module is fed back to the input of said demand module in a translated context to thereby provide complete external modularity and flexibility to said translative device.

19. In a store and forward message switching system for high speed message handling, the combination comprising, at least a single data demand module including an assembly and distribution register and a line organized memory, a plurality of message lines, each of said lines having a service requesting means associated therewith, a scanner, said scanner connected to sequentially scan said message lines and being responsive to said service requesting means, when activated, to cause the data contained in the corresponding line location of said line organized memory to be transferred to said register and to have its content modified in response to said service requesting means, the resulting data content of said register thereafter being returned to its original line location.

No references cited.

ROBERT C. BAILEY, *Primary Examiner.*

R. B. ZACHE, *Assistant Examiner.*